US010909464B2

(12) United States Patent
Priness et al.

(10) Patent No.: US 10,909,464 B2
(45) Date of Patent: Feb. 2, 2021

(54) SEMANTIC LOCATIONS PREDICTION

(71) Applicant: Microsoft Technology Licensing, LLC, Redmond, WA (US)

(72) Inventors: Ido Priness, Herzliya (IL); Dikla Dotan-Cohen, Herzliya (IL); Haim Somech, Ramat Gan (IL); Ido Cohn, Tel Aviv (IL); Shira Weinberg, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 784 days.

(21) Appl. No.: 15/141,405

(22) Filed: Apr. 28, 2016

(65) Prior Publication Data

US 2016/0321551 A1 Nov. 3, 2016

Related U.S. Application Data

(60) Provisional application No. 62/154,704, filed on Apr. 29, 2015.

(51) Int. Cl.
*G06N 5/02* (2006.01)
*G06N 5/04* (2006.01)
(Continued)

(52) U.S. Cl.
CPC ............. *G06N 5/047* (2013.01); *G06N 7/005* (2013.01); *G06Q 10/00* (2013.01);
(Continued)

(58) Field of Classification Search
CPC ........ G06N 5/047; G06N 7/005; G06Q 10/00; G06Q 30/0251; G06Q 30/0261; G06Q 30/0269
(Continued)

(56) References Cited

U.S. PATENT DOCUMENTS 5,572,221 A * 11/1996 Marlevi ................ H04W 28/18
342/452
8,065,257 B2 11/2011 Kuecuekyan
(Continued)

FOREIGN PATENT DOCUMENTS

WO 2013106995 A1 7/2013

OTHER PUBLICATIONS

Chen et al. "A personal route prediction system based on trajectory data mining", 2011, Information Sciences 181, pp. 1264-1284.*
(Continued)

*Primary Examiner* — Jue Louie
(74) *Attorney, Agent, or Firm* — Shook, Hardy and Bacon, L.L.P.

(57) ABSTRACT

Aspects of the technology described herein provide a personalized computing experience for a user based on a predicted future semantic location of the user. In particular, a likely future location (or sequences of future locations) for a user may be determined, including contextual information about the future location. Using information from the current context of the user's current location with historical observations about the user and expected user events, out-of-routine events, or other lasting or ephemeral information, a prediction of one or more future semantic locations and corresponding confidences may be determined and used for providing personalized computing services to the user. The prediction may be provided to an application or service such as a personal assistant service associated with the user, or may be provided as an API to facilitate consumption of the prediction information by an application or service.

20 Claims, 9 Drawing Sheets

(51) Int. Cl.
*G06Q 30/02* (2012.01)
*G06Q 10/00* (2012.01)
*G06N 7/00* (2006.01)

(52) U.S. Cl.
CPC ..... *G06Q 30/0251* (2013.01); *G06Q 30/0261* (2013.01); *G06Q 30/0269* (2013.01)

(58) Field of Classification Search
USPC ...................................................... 706/1–62
See application file for complete search history.

(56) References Cited

U.S. PATENT DOCUMENTS

| | | | |
|---|---|---|---|
| 8,073,460 B1* | 12/2011 | Scofield | H04W 4/21 455/456.1 |
| 8,275,540 B2 | 9/2012 | Downs et al. | |
| 8,412,234 B1 | 4/2013 | Gatmir-Motahari et al. | |
| 8,452,353 B2 | 5/2013 | Crawford | |
| 8,498,817 B1* | 7/2013 | Erdmann | G01C 21/3617 701/519 |
| 8,583,471 B1* | 11/2013 | Voskuhl | G06Q 30/0254 705/14.53 |
| 8,589,330 B2 | 11/2013 | Petersen et al. | |
| 8,620,393 B2 | 12/2013 | Bornstein et al. | |
| 8,694,456 B2 | 4/2014 | Grigg et al. | |
| 8,812,018 B2 | 8/2014 | Cooper et al. | |
| 8,949,013 B2 | 2/2015 | Yang et al. | |
| 9,420,426 B2 | 8/2016 | Duleba et al. | |
| 9,730,163 B2 | 8/2017 | Haro et al. | |
| 2003/0130987 A1* | 7/2003 | Edlund | G06F 16/2477 |
| 2010/0114423 A1* | 5/2010 | Boss | G08G 1/205 701/29.4 |
| 2010/0142808 A1* | 6/2010 | Bhagavat | H04N 1/409 382/165 |
| 2010/0214117 A1 | 8/2010 | Hazzani | |
| 2011/0125678 A1 | 5/2011 | Partridge | |
| 2012/0253855 A1 | 10/2012 | Chand et al. | |
| 2013/0006777 A1* | 1/2013 | Krishnareddy | G06Q 10/04 705/14.66 |
| 2013/0345961 A1 | 12/2013 | Leader et al. | |
| 2013/0346523 A1 | 12/2013 | Praun et al. | |
| 2014/0128105 A1* | 5/2014 | Su | H04W 4/021 455/456.3 |
| 2014/0172292 A1* | 6/2014 | McGee | G01C 21/3605 701/418 |
| 2014/0207725 A1* | 7/2014 | Li | G06N 7/005 706/52 |
| 2014/0278086 A1* | 9/2014 | San Filippo | G01C 21/3423 701/527 |
| 2014/0278688 A1 | 9/2014 | Sullivan et al. | |
| 2014/0343841 A1* | 11/2014 | Faaborg | G01C 21/3438 701/465 |
| 2014/0364149 A1* | 12/2014 | Marti | G01C 21/34 455/456.3 |
| 2015/0038162 A1 | 2/2015 | Duleba et al. | |
| 2015/0134244 A1* | 5/2015 | Hershey | G01C 21/3617 701/489 |
| 2015/0161570 A1* | 6/2015 | Burgmeier | G06Q 10/1095 705/7.19 |
| 2016/0164974 A1* | 6/2016 | Lavee | G06Q 30/0251 707/722 |
| 2016/0189228 A1* | 6/2016 | Vaccari | G06Q 30/0261 705/14.58 |
| 2016/0360377 A1 | 12/2016 | Lovich et al. | |
| 2017/0013408 A1* | 1/2017 | Grzywaczewski | H04W 4/029 |
| 2019/0090197 A1 | 3/2019 | Priness et al. | |

OTHER PUBLICATIONS

Tran et al. "Next Place Prediction using Mobile Data", 2012, Mobile Data Chalenge 2012 Workshop.*

Bapierre, "context Specific next location prediction", 2014,. Theses, Munich Techn. Univ.*

"International Search Report and Written Opinion Issued in PCT Application No. PCT/US2016/030148", dated Jun. 28, 2016, 13 Pages.

Zhu, et al., "Nokia Mobile Data Challenge: Predicting Semantic Place and Next Place via Mobile Data", In Proceedings of Mobile Data Challenge Workshop, Jun. 18, 2012, 6 pages.

Burbey, Ingrid E., "Predicting Future Locations and Arrival Times of Individuals", In Doctoral Dissertation, Apr. 26, 2011, 225 pages.

"Getting the User's Location", Retrieved from: https://developer.apple.com/documentation/corelocation/getting_the_user_s_location, Jan. 2, 2017, 5 Pages.

"Using the Visits Location Service", Retrieved from: https://developer.apple.com/documentation/corelocation/getting_the_user_s_location/using_the_visits_location_service, Retrieved on: Jan. 2, 2017, 5 Pages.

Hong, Eliane, "Pathsense Competes With GPS by Saving Up the Smartphone's Battery", Retrieved from: https://atelier.bnpparibas/en/life-work/article/demo-pathsense-competes-gps-saving-smartphone-s-battery, Dec. 2014, 10 Pages.

Lane, Dave, "How to Implement Geolocation without Draining Your User's Battery", Retrieved from:https://metova.com/how-to-implement-geolocation-without-draining-your-users-battery/, Dec. 12, 2014, 11 Pages.

Nield, David, "Change Your Android Phone's Settings Based on Where You Are", Retrieved from: http://fieldguide.gizmodo.com/change-your-android-phones-settings-based-on-where-you-1597903597, Jan. 7, 2014, 8 Pages.

Thumar, Brijesh, "Location Use cases Best Practices", Retrieved from: http://androidkt.com/category/google-api-client/, Dec. 5, 2017, 27 Pages.

Vhatkar, et al., "Internal Location Based System for Mobile Devices Using Passive RFID and Wireless Technology", In International Journal of Computer Science and Information Security, vol. 6, No. 3, Dec. 2009, pp. 153-159.

"International Search Report and Written Opinion Issued in PCT Application No. PCT/US2019/061047", dated Mar. 19, 2020, 14 Pages.

* cited by examiner

SEMANTIC LOCATIONS PREDICTION

CROSS-REFERENCE TO RELATED APPLICATIONS

This application claims the benefit of U.S. Provisional Application No. 62/154,704, titled "Semantic Locations Prediction," filed Apr. 29, 2015, which is hereby expressly incorporated by reference in its entirety.

BACKGROUND

Most people will visit a number of locations throughout a typical day. For example, someone may go to a school to drop off their kids before going to work in the morning, and then go by the gym, and then stop by the store near the gym on the way home. Sometimes when a person gets to work later than normal, perhaps because of a doctor's appointment in the morning, the person may decide to stay at work later and not go to the gym (and thus not go to the nearby store) on the way home. But if the person needed to buy something at the store, then it might be helpful to provide a reminder about it before they left work, so they could go to another store on the way home. Similarly, if the person was going to stay at work later than normal, then it might be helpful to alter the person's thermostat settings so that the house is at the right temperature when they arrive home. Thus, by understanding a person's routines, habits, and decision making in the context of the locations the person visits, a personalized computing experience of useful applications and services may be provided for the person's benefit.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in this disclosure are directed towards systems and methods for providing a personalized computing experience for a user of the technologies described herein based on determining future semantic location information for the user. In particular, embodiments may determine a likely location (or likely sequence(s) of locations) that a user will visit in the future. Some embodiments may further predict related contextual or semantic information, such as when a user will likely arrive; how long a user will likely stay; likely activity of the user associated with the location (e.g., exercising at a gym or grocery shopping); or other contextual information. Using information about the user's current location with historical observations about the user, expected user events (e.g., an expected flight or an appointment), and/or other lasting information or ephemeral information (e.g., holidays and traffic, respectively), a prediction of one or more future semantic locations and corresponding confidences may be determined and may be used for providing a personalized computing experience to the user. Additionally, some embodiments of the disclosure are able to predict unique or relatively rare future events. The prediction information may be provided to an application or service such as a personal assistant (sometimes referred to as a virtual assistant) service associated with the user, or may be provided as an application programming interface (API) to facilitate consumption of the prediction information by an application or service. Further, in some cases, the predictions may be adjusted or updated based on a context of a current visit (current context). In this way, embodiments of the disclosure are able to provide higher accuracy and freshness than previous approaches to predicting a user's future location.

BRIEF DESCRIPTION OF THE DRAWINGS

Aspects of the technology described in the present application are described in detail below with reference to the attached drawing figures, wherein.

DETAILED DESCRIPTION

Figure 1:
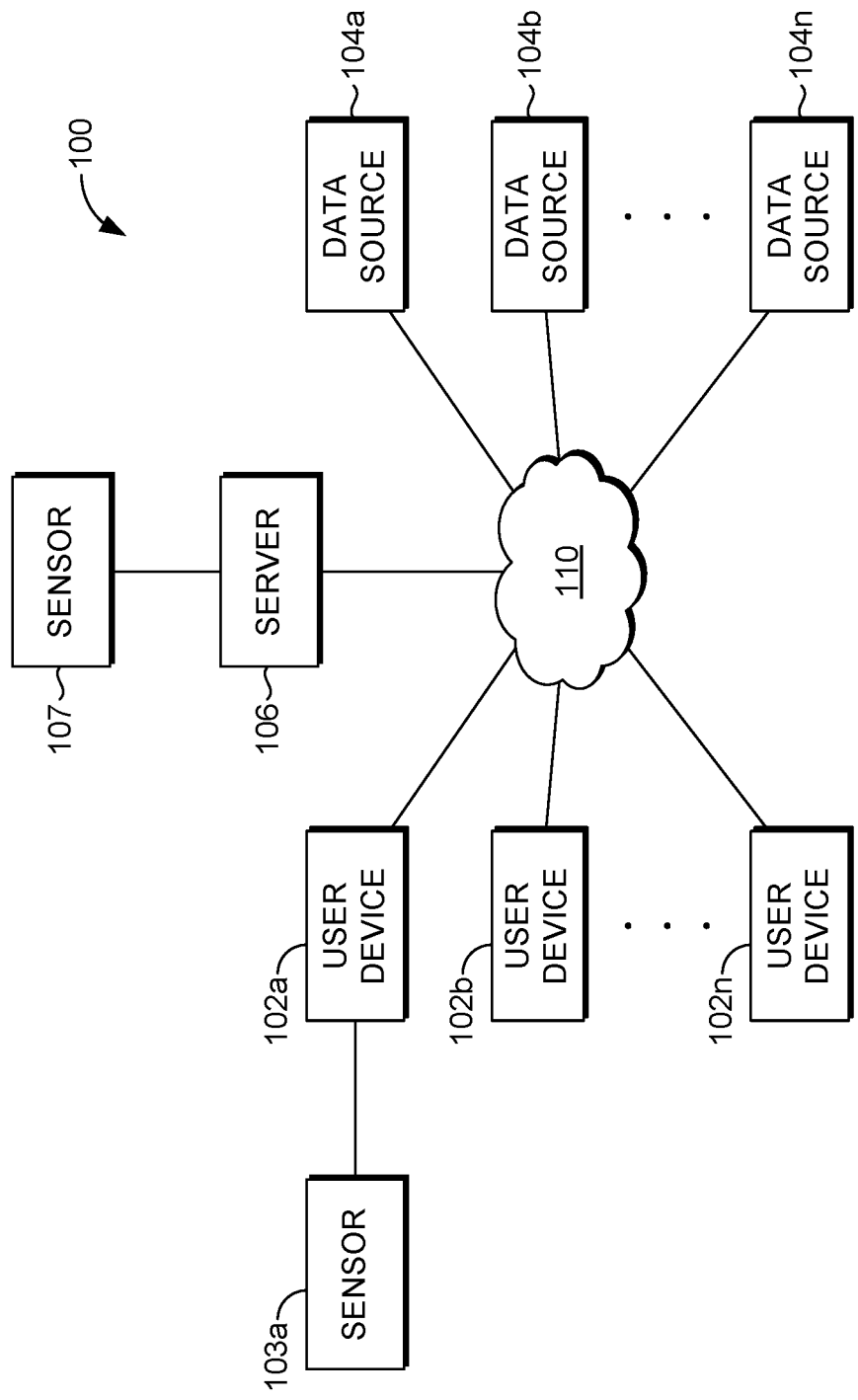
FIG. 1 is a block diagram of an example operating environment suitable for implementing aspects of the disclosure.

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are directed towards systems, methods, and computer storage media for, among other things, determining future semantic location information about a user, or providing a personalized computing experience based on the determined future semantic location information. In particular, embodiments may provide a likely future location (or likely sequence(s) of future locations) for a user, which may include contextual or semantic information. By way of example and not limitation, the semantic information may include arrival time, length of stay, departure time from the current location, purpose of visiting the future location, events or user activity associated with the future location, a specific venue, which may include venue disambiguation in circumstances where more than one venue share a similar geographic location, other people known by the user (e.g., social network contacts, co-workers, business contacts, or family members) who are likely to also be at the future location at the same time as the user, or other information related to the future location visit. The prediction information may be provided to an application or service such as a personal digital assistant service (or virtual assistant) associated with the user, or may be provided as an API to facilitate consumption of the location(s) prediction information by a computing application or service.

In this way, embodiments of the disclosure are able to provide higher accuracy and freshness than conventional approaches to predicting a user's future location. In particular, as further described herein, embodiments of the disclosure are adaptive and capable of accounting for external or explicit information, such as out-of-routine activity of a user, when determining a future semantic location. Moreover, some embodiments leverage the most relevant information about the user, such as user behavior patterns and visit patterns, to determine a more accurate prediction than conventional approaches. Still further, unlike conventional approaches, some embodiments of the disclosure provide a corresponding context of the future location, such as the semantic location features described herein (e.g., arrival time, length of stay, etc.).

As further described herein, in some embodiments, information about the user's current visit to a location may be used with historical observations data about the user, and explicit information related to the user's future location(s), such as expected user events (e.g., an expected flight), and/or other lasting information or ephemeral information (e.g., holidays and traffic, respectively) to determine a prediction of one or more semantic locations that the user will likely visit in the future. A future semantic location may comprise a semantic location that the user is expected to visit next, after the currently visited semantic location (or at a future time, following visiting the current location), or also may comprise a series or sequence of future semantic locations expected to be visited by the user. For example, the future semantic location information may indicate that a user will most likely go to the gym, then the store, and then to her house. The prediction may also include related contextual information, such as when the user is likely to leave the current location for the future location, when the user is likely to arrive at a future location, how long the user will likely stay, or likely activity to be performed by the user or events associated with the future location.

In some embodiments, a corresponding confidence value also may be determined for each predicted future semantic location or for a sequence, and may correspond to alternative predicted future locations. Thus, for example, an embodiment may determine that the user has a sixty percent likelihood of going to a restaurant next. Similarly, an embodiment may determine that the user has an eighty percent likelihood that a next or future location visited will be the gym and a twenty percent likelihood that the next location visited by the user will be the user's home. Moreover, in some embodiments, the confidence may indicate a likelihood associated with a particular category of venue (or activity, event, purpose, or type of visit) and/or a specific venue (or specific activity, event, purpose, or type of visit). For example, an embodiment may determine that the user has a sixty percent likelihood that a next or future location visited will be a restaurant and a fifteen percent likelihood that the visited restaurant will be a particular restaurant, such as Segev Kitchen Garden.

As previously described, the semantic location prediction (which, for some embodiments, includes corresponding confidence(s) and/or alternative predicted locations (e.g., an eighty percent probability of next visiting place A and a twenty percent probability of visiting place B)) may be used for providing a personalized computing experience to the user. Further, in some cases, the predictions may be adjusted or updated based on the current context, which may include new or updated explicit information, as further described herein.

Some embodiments of this disclosure may utilize a set of one or more predictor programs or routines (sometimes referred to as "predictors") for determining a set of future semantic location predictions and then utilize a selection process for determining which predictions (provided by the set of predictor(s)) should be used. Additionally, in some embodiments, explicit information may be determined that can impact the user's future semantic location(s), including context (or features) associated with the future semantic location such as arrival time or length of stay. By way of example and not limitation, such explicit information may include external signals or events associated with the user (e.g., flights, travel, vacation, etc.), user calendar information (e.g., appointments, meetings, out-of-office indications, etc.), out-of-routine information for the user, or other external information as described herein, such as lasting information (e.g., holidays) or ephemeral information (e.g., traffic, weather, temporary incidents such as closures, etc.). Although the term "explicit" is used to describe this information, instances of explicit information may include implicit data including, for example, information determined by inference. Thus, the term explicit is used broadly in the sense that this "explicit" information comprises information that may explicitly impact the predicted location(s). The selected prediction(s) provided by one or more predictors may be conflated or otherwise reconciled with explicit information to determine a coherent predicted future location (or series of locations) for the user.

In some cases, embodiments described herein determine future semantic location information regarding unique or relatively rare future visits or events. For example, as will be further described, in one embodiment, an unusual future semantic location for a user may be predicted by identifying uncommon features in the user's current context, determining evidence of similar features in historic observations, and deriving only the relevant insights, from similar historic observations, for the current context in order to provide a better prediction.

In certain respects, aspects of the present disclosure relate to determining future semantic location information about a user, which may be used for providing computing services tailored to the user or content personalized to the user. The term "semantic location" is used broadly herein and may include geographical location information as well as contextual information, such as the purpose or activity of a user's visit to the location, whether the user is visiting a venue at the location or just passing by the location, a specific venue that the user is visiting (e.g., not just a shopping center, but a specific coffee house in the shopping center), the arrival time, and/or length of stay. Accordingly, in some embodiments, semantic information may include information about a user's activities or venue rather than merely their geographic location; for instance, it may be determined that a user in the geographical location of a movie theater for several hours has watched a movie.

The term "current context" is used broadly herein to include information associated with the user's current semantic location or current visit, as well as other information related to the current visit. For example, current context may include current visit information as well as context features or contextual information associated with the current visit, such as the user's arrival time to the current location; the location(s) of the user (including geographic location or semantic location) prior to the current location (i.e., where the user came from); date, time, day of the week information; user activity detected in connection to the current visit or previous location(s) visited prior to the current location; or other people the user knows who are determined to be at the current location or previous location(s), for example.

A predicted semantic location (or a next location or future location) of a user may comprise a semantic location visited immediately following the current semantic location or a location that may be visited subsequent to the current location, but not necessarily immediately following the current location. In embodiments where a sequence of future semantic locations are determined, the sequence may comprise an ordered set of locations (for example, the user is likely to go to place A followed by place B followed by place C), or a series of future locations that are likely to occur, but in which there may be other locations in the series that are not in the predicted series; for example, the user is next likely to visit place A and then place B and then place C, but the user may visit place X between places A and B or B and C. Moreover, in this instance, some embodiments may update a predicted future semantic location (or sequence) upon determining that the user has visited place X.

Accordingly, at a high level, in one embodiment of the technologies described herein, user data is received from one or more data sources. The user data may be received by collecting user data with one or more sensors or components on user computing device(s) associated with a user. Examples of user data, which is further described in connection to user-data collection component 210 of FIG. 2, may include location information of the user's computing device(s) ("user device(s)"), user-activity information (e.g., app usage, online activity, searches, calls, or other user device interactions), application data, contacts data, calendar and social network data, or nearly any other source of user-related data that may be sensed or determined by a user device or other computing device. As further described herein, the received user data may be used for determining a current context of the current visit. In an embodiment, user data first may be used to determine information about a current visit, which may include semantic location information associated with the current visit, and from the current visit information, a current context may be determined. In one embodiment, user location history information from previous visits to the current location, as well as received user data, also may be used to facilitate determining the current visit or predicting future locations, as described herein.

Information regarding one or more previous visits to the current location (i.e., historical observations or historical visits information) may be determined based in part on information from the current context. In particular, current user location information (which may be provided by user-data collection component 210 of FIG. 2) and historic location information (which may be provided from historic location data 243 of FIG. 2) associated with the user may be used to identify a set of historical visits of the user to the current location. Information from these historical visits and information from the current context then may be provided to one or more predictors for determining a set of history-based predictions about a user's future location(s). From among the set of history-based predictions, one or more likely history-based prediction(s) may be determined. For example, in one embodiment, the history-based prediction(s) may be selected based on confidence values (or a confidence "score") associated with each prediction.

Explicit information that can impact the predicted future semantic location(s) is also determined, in some embodiments, and reconciled with the set of determined history-based prediction(s). For example, in one embodiment, the explicit information is conflated with the history-based prediction(s) in order to determine a coherent prediction (or predictions). Information about the coherent prediction may be provided to a computer application or service, such as a virtual assistant service associated with the user, or may be provided in connection with an API to facilitate consumption of the prediction information by a computer application or service, such as a calendar or scheduling application. Further, some embodiments may be carried out by a virtual assistant application or service, which may be implemented as one or more computer applications, services, or routines, such as an app running on a mobile device and/or in the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
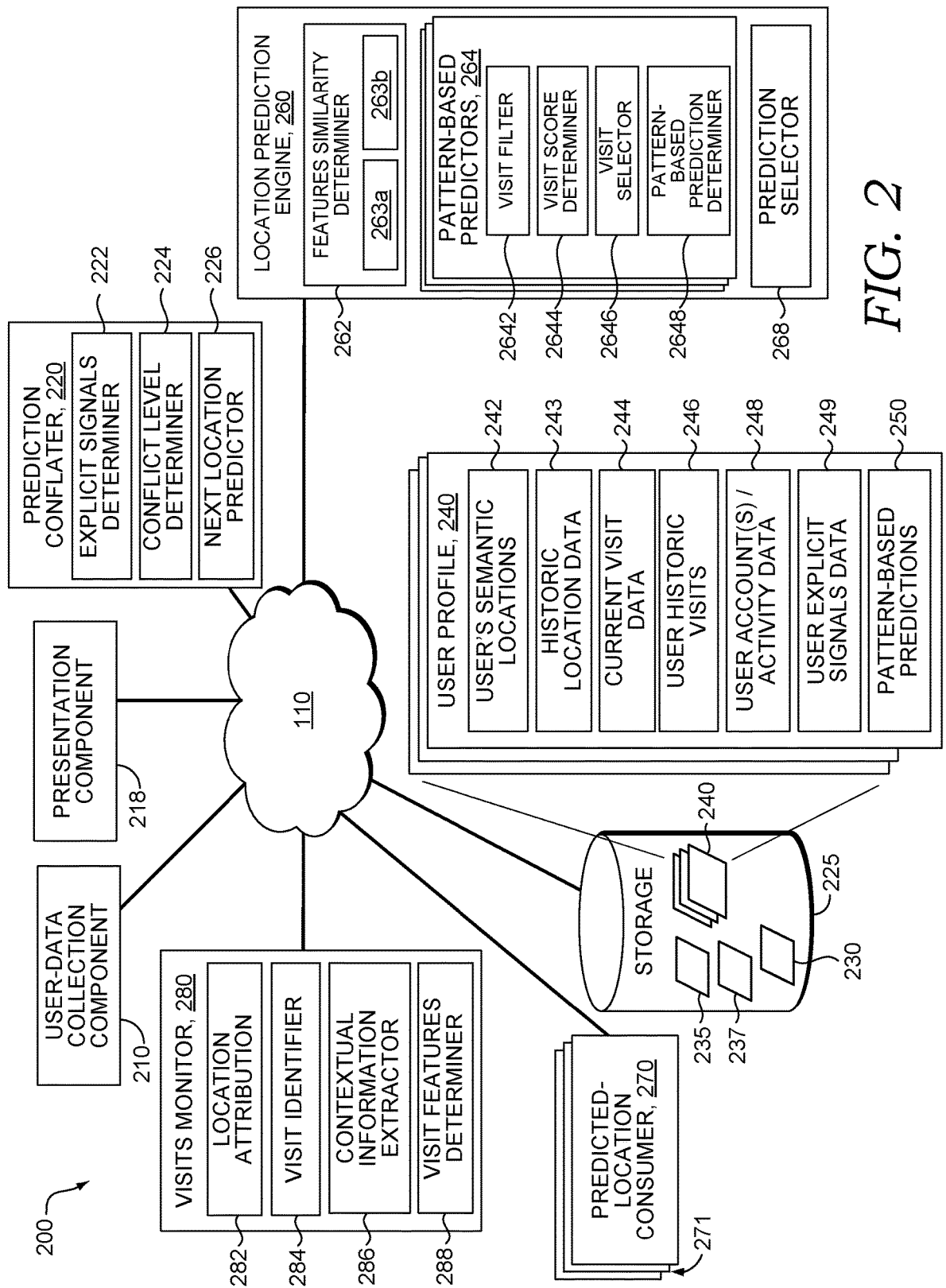
FIG. 2 is a diagram depicting an example computing architecture suitable for implementing aspects of the disclosure.

Operating environment 100 can be utilized to implement one or more of the components of system 200, described in FIG. 2, including components for collecting user data, monitoring user activity and events, determining future location predictions, consuming location prediction information to provide an improved user experience, generating personalized content, and/or presenting notifications and related content to users. Operating environment 100 also can be utilized for implementing aspects of process flow 300, described in FIGS. 3A-3D, or methods 400 or 500 in FIGS. 4 and 5, respectively. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 218, visits monitor 280, location prediction engine 260, prediction conflater 220, one or more predicted-location consumers 270, and storage 225. Visits monitor 280 (including its components 282, 284, 286, and 288), location prediction engine 260 (including its components and subcomponents 262, 263a, 263b, 264, 2642, 2644, 2646, 2648, and 268), user-data collection component 210, presentation component 218, and prediction conflater 220 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal digital assistant (sometimes referred to as "virtual assistant") applications, services, or routines. In particular, such applications, services, or routines may operate on one or more user devices (such as user device 104a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for visits monitor 280, location prediction engine 260, prediction conflater 220, or other components or subcomponents of system 200. The data may be received (or accessed), and optionally accumulated, reformatted and/or combined, by user-data collection component 210 and stored in one or more data stores such as storage 225, where it may be available to the components or subcomponents of system 200. For example, the user data may be stored in or associated with a user profile 240, as described herein. In some embodiments, any personally identifying data (i.e., user data that specifically identifies particular users) is either not uploaded from the one or more data sources with the user data, is not permanently stored, and/or is not made available to the components or subcomponents of system 200.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information, such as user data, from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data, particularly in the form of event data and/or location data, can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

Visits monitor 280 is generally responsible for monitoring user data for information that may be used for determining current user visit(s) to a semantic location and context of the visits (current context). Visits monitor 280 also may determine historic user visits and, in some instances, features associated with those historic visits, which may be used for determining context associated with the historic visits. In some embodiments, information determined by visits monitor 280 may be provided to location prediction engine 260 including information regarding the current context and historical visits (historical observations).

At a high level, embodiments of visits monitor 280 may use current user data, including location information, to determine or attribute the user's current location, which may be carried out by location attribution component 282, described below. Based on the current location attribution, a current visit for the user may be determined. In some embodiments, a current visit may be determined using features identified from the user data (including current or historical user data), such as how long the user is at a particular location. For example, user data indicating that a user was in the same approximate geographical location for a period of time is more likely to imply a visit occurred than user data indicating the user was only at a particular location briefly (such as in the case where a user is driving by a location, but not visiting it.) Thus, a "visit" may indicate a degree of intention by the user to be at the user's current location. In some embodiments, a visit may be determined where a user remains approximately at the same geographical location over a time frame. In contrast, merely passing through a current location or momentarily being at a current location may indicate that a visit has not occurred at the current location. In some embodiments, a current or historic visit may be determined by visit identifier 284, described below, and features associated with the visit may be identified by visit features determiner 288, also described below.

User location history information associated with previous visits to the current location may also be used for determining a current visit, in some embodiments. For instance, in an embodiment, location history information about where a user just came from (the user's previous location) is used for facilitating visit identification, such as where disambiguation is used to identify semantic information about the current visit. For example, where user location history information indicates that the user was previously at a restaurant, and current location information indicates the user is at another geographic location that has a coffee shop and a restaurant, then it may be determined, using disambiguation, that the user is more likely at the coffee shop than at another restaurant.

As shown in example system 200, visits monitor 280 comprises a location attribution component 282, visit identifier 284, contextual information extractor 286, and visit features determiner 288. In some embodiments, visits monitor 280 and/or one or more of its subcomponents may determine interpretive data from received user data. Interpretive data corresponds to data utilized by the subcomponents of visits monitor 280 (or other components or subcomponents of system 200) to interpret user data. For example, interpretive data can be used to provide context to user data, which can support determinations or inferences made by the subcomponents, such as the disambiguation example described above. Moreover, it is contemplated that embodiments of visits monitor 280, its subcomponents, and other components of system 200 may use user data and/or user data in combination with interpretive data for carrying out the objectives of the subcomponents described herein.

Location attribution component 282, in general, is responsible for determining location attribution using user data, as described previously. Examples of user data may include any user data (or sensor data) indicating location information, such as GPS, wireless communications (e.g., cellular or Wi-Fi Access Point), IP addresses associated with current user activity, user check-in/social-networking information, or other user data from which location information may be determined. In some embodiments, location attribution component 282 attributes the location to a location of interest to the user, such as locations frequented by the user (sometimes called "hubs"). For example, in some embodiments, locations indicated by the location data may be clustered and the dense clusters used for determining those locations wherein a user spends time (e.g., hubs). Further, in some embodiments, location attribution component 282 performs filtering, which may remove location information outliers (e.g., a Wi-Fi-derived location data point from 300 yards away suggesting that the user is at that location); clustering; or other means to determine location data for attribution. Embodiments of location attribution component 282 may determine current location and may also perform location attribution with historic location data associated with the user (such as logged user data or logged location information, which may be stored in a user profile such as historic location data 243 in user profile 240). The current and historic location attributions may be used for determining visits, including current and historical visits.

Visit identifier 284, in general, is responsible for determining (or identifying) a visit has occurred. Embodiments of visit identifier 284 may be used for determining a current visit or one or more historical visits, such as historical visits to the same location as the current visit. Some embodiments of visit identifier 284 may use the location attributions determined by location attribution component 282 to identify a visit. For example, as described previously, user data indicating that a user was in the same approximate geographical location for a period of time may indicate a visit. In particular, in one embodiment, visits may be identified by concatenating consecutive (or substantially consecutive) user location data indicating the user is near the same approximate location, and in some cases filtering out outliers. For instance, visits monitor 280 may monitor location information (which may be obtained from user data provided by a user-data collection component 210), continuously, periodically, or as needed. In some cases, the monitored location information may have corresponding timestamp for when the location information was sensed or otherwise determined Thus, a collection of location-time data may be determined that includes data points indicating a location (which may be a geographical location or semantic location) and a corresponding time that the location was detected. In some embodiments, the location-time data comprises a time series of location information. Accordingly, in some embodiments, a visit may be determined based on concatenating consecutive (or approximately consecutive) data points in the time-series that indicate the same approximate location. In some embodiments, the location-time data may be stored in current visit data 244 (if associated with a current visit) or historic location data 243 (if associated with a historical visit). A current visit may be determined using current location attribution data, and historical visits determined using the historical location attribution data.

Contextual information extractor 286, in general, is responsible for determining contextual information related to the visits (detected by visit identifier 284 or visits monitor 280), such as context features or variables associated with a particular visit or other information related to the visit. In some embodiments, contextual information extractor 286 may associate the determined contextual information with the related visit and may also log the contextual information with the visit. Alternatively, the association or logging may be carried out by another service. For example, some embodiments of contextual information extractor 286 provide the determined contextual information to visit features determiner 288, which determines features or variables associated with the visit (such as described below) and/or related contextual information.

Some embodiments of contextual information extractor 286 determine contextual information related to a visit such as entities related to the visit (e.g., other people present at the location), a venue or venue-related information about the visit, or detected activity performed by the user at the location. By way of example and not limitation, this may include context features such as information about the location, such as venue information (e.g., this is the user's office location, home location, gym, etc.), time (including, for instance, arrival/departure times or duration of stay), day, and/or date, which may be represented as a time stamp associated with the visit, other user activity preceding and/or following the visit, other information about the visit such as entities associated with the visit (e.g., venues, people, objects, etc.), information detected by sensor(s) on user devices associated with the user that is concurrent or substantially concurrent to the visit (e.g., user activity detected via a computing device such as watching a streaming movie on a entertainment console, or motion information or physiological information detected on a fitness tracking user device, for example), user interaction on one or more user devices (such as browsing certain types of webpages, listening to music, taking pictures, composing email, or any other type of user device interaction), social media activity, or any other information related to the visit that is detectable that may be used for determining features or patterns associated with user visits.

In embodiments using contextual information related to a user's user devices, a particular user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine location information or contextual information about the devices. This information may be used for determining a label or identification of the device (e.g., a device ID) so that contextual information about a particular visit captured on one user device may be recognized and distinguished from data captured by another user device. Where two or more user devices associated with a user are in different locations, visit logic 235 (as described below) may be used to reconcile the location data and determine the most probable location of the user. In some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

In some implementations, contextual information extractor 286 may receive user data from user-data collection component 210, parse the data, in some instances, and identify and extract context features or variables (which also may be carried out by visit features determiner 288). Context variables may be stored as a related set of contextual information associated with a visit, and may be stored in a user profile such as in user profile 240. For instance, contextual information associated with historic visits may be stored in user historic visits component 246, and contextual information associated with the current visit may be stored in current visit data 244.

In some cases, contextual information may be used by one or more predicted-location consumers, such as for personalizing content or a user experience, such as when, where, or how to present content. Contextual information also may be determined from the user data of other users present during the visit, in some embodiments, which may be provided by another user-data collection component 210 in lieu of or in addition to user data for the particular user. Additionally, the context information may be used in part to determine a current context of a current visit, as described below.

Visit features determiner 288, in general, is responsible for identifying features associated with visits. Features associated with a visit, sometimes referred to herein as context features, may be used by visits monitor 280 to determine the context of the visit. For the current visit, this is the current context, which may be stored in current visits data 244 of user profile 240. Features also may include contextual information and other details associated with a visit. By way of example and not limitation, visit features may include the location (such as the geographic and/or semantic location), time and date, arrival time, departure time, length of stay, previous location(s) visited, next locations visited, sequences or series of locations, day of the week, user activity during the visit, user activity prior to or subsequent to the visit, information about other users associated with the visit (for example, if the visit is a meeting, then the other invitees/attendees of the meeting), or nearly any measurable or otherwise determinable variable associated with a visit.

In some embodiments, visit logic 235 may be utilized for determining a visit, contextual information associated with a visit, and/or features of the visit. Visit logic 235 may include rules, conditions, associations, classification models, or other criteria to identify a visit and contextual information or features associated with the visit. For example, in one embodiment, visit logic 235 may include comparing visit criteria with the user data in order to determine that a visit has occurred and/or particular features associated with a determined visit. The visit logic 235 can take many different forms depending on the mechanism used to identify a particular visit or feature of a visit. For example, the visit logic 235 may comprise training data used to train a neural network that is used to evaluate user data to determine when a visit has occurred, or when particular features are present in a determined visit. The visit logic may comprise static rules (which may be predefined or may be set based on settings or preferences in a user profile associated with the user), Boolean logic, fuzzy logic, neural network, finite state machine, support vector machine, logistic regression, clustering, or machine learning techniques, similar statistical classification processes, other rules, conditions, associations, or combinations of these to identify a visit and/or visit feature from user data. For instance, visit logic may specify types of user device interaction(s) information that are associated with a visit feature, such as launching a fitness tracking app which may occur at a gym, navigating to a website to read a movie review, or composing an email.

In one embodiment, features determined by visit features determiner 288 may be stored as one or more label(s), tag(s), or metadata associated with the visit information, and may be used for indexing visits determined by visit identifier 284. Information about visits determined by visits monitor 280, including in some embodiments the determined contextual information or features associated with the visit(s), may be stored in a user profile 240 associated with a user, such as in current visit data 244 (for current visit information) and/or user historic visits 246 (for historic visit/location information).

Continuing with FIG. 2, location prediction engine 260 is generally responsible for determining one or more possible future location (or sequence(s) of future locations) to be visited by a user. As shown in example system 200, location prediction engine 260 comprises features similarity determiner 262, one or more pattern-based predictors 264, and prediction selector 268. At a high level, embodiments of location prediction engine 260 receive user visit information, such as current visit and historical visits, which may be determined by visits monitor 280, and utilize this information to generate a pattern-based prediction of a next or future location for the user (or locations, as described previously). In some embodiments, a corresponding confidence is also determined for the prediction(s). Further, the prediction may comprise a single location, a sequence of locations, or probabilities for multiple locations; for example, an eighty percent likelihood that the next location will be the user's gym and a twenty percent likelihood that the next location will be the user's home.

Features similarity determiner 262, in general, is responsible for determining features in the historical visits that are similar to features in the current visit (put another way, context(s) of historical visits that are similar to the current visit (i.e., the current context)). Features similarity determiner 262 may be used in conjunction with one or more features pattern determiners (e.g., determiners 263a and 263b, described below) to determine a set of historical visits that are similar to the current visit (or context(s) associated with historic visits that are in common with the current context). The set of historical visits similar to the current visit then may be used as inputs to a particular pattern based predictor 264, as described further below.

In some embodiments, features similarity determiner 262 comprises subcomponents for determining similarity among visits of different types of features or feature-based patterns of visits. For example, as shown in example system 200, features similarity determiner 262 comprises periodic features similarity determiner 263*a* and behavior features similarity determiner 263*b*. Periodic features comprise, for example, features of visits that occur approximately periodically; for example, visits occurring on the same particular time(s) of day, day of the week or month, even/odd days (or weeks), monthly, yearly, every other day, every $3^{rd}$ day, etc. Behavior features comprise user behaviors such as arrival time, length of stay, user activities (e.g. user behavior) occurring during the visit, previous location visited before the current location (or sequence of previous locations visited, such as the sequence of the last K locations the user visited prior to current visit (or historic visit)), for example, as well as uncommon or out-of-routine features (such as features indicating the user is at home on a workday (which may occur infrequency such as when the user is sick) or features associated with a location that the user rarely visits, such as a city on another continent. For instance, a user usually goes to the gym after work on days that the user has a major meeting that day at work; similarly a user usually does not go to the gym after work when the user arrives to work late, and instead typically works later. In some embodiments, features similarity determiner 262 may determine visitation sequence similarity (e.g. the sequence of the last K locations the user visited prior to current visit (or historic visit) using a Visit Sequence Match feature, which determines the Levenschtein distance between the historical visit (the observed visit) and current visits sequences). In some embodiments of features similarity determiner 262, other features pattern determiners (not shown) may be utilized, such as features pattern determiners for determining similarity between the presence of other people at the current visit and historical visits, such as contacts or social media acquaintances of the user, similarity of activity conducted by other people detected at the current visit and historical visits, similarity of events determined to be occurring at the current visit and events of historical visits, or similarity of any other aspect, feature, or context associated with a current visit and historical visit.

Pattern-based predictors 264 comprise one or more predictor programs or routines ("predictors") for predicting a next or future possible location of the user based in part on feature patterns of similarity (e.g., behavior and periodic features) between a current visit and a set of historical visits. At a high level, a pattern-based predictor 264 receives current and historical visit information and associated features (or current and historic contexts), which may be received from a user profile 240 of the user, and determines a prediction about the next (or future) user location. In an embodiment, a pattern-based predictor 264 uses features similarity determiner 262 to determine patterns or features in common between historical visits and the current visit to identify a subset of historical visits similar to the current visit. For example, periodic features similarity determiner 263*a* may be used to determine, from among the set of historical visits, those historical visits having a periodic feature in common with the current visit. Thus, for instance, if the current visit happened on a Monday on the first day of the month, on an even week, and on a weekday, then periodic features similarity determiner 263*a* might determine those historical visits that have features indicating that the visit happened on a Monday, those historical visits having features corresponding to the first day of the month (any first day, not just Mondays), or an even week, or a weekday. Likewise, behavior features similarity determiner 263*b* may be used to determine sets of historical visits having a particular behavior feature in common with the current visit. For example, if the current visit corresponds to the user visiting her workplace, and an arrival time indicates that the user arrived later than normal (or indicates that the user arrived at a particular time), then a set of historical visits determined using behavior features similarity determiner 263*b* might include those previous visits where the user also arrived to work later than normal (or visits where the user arrived at a time close to the arrival time of the current visit).

In one embodiment, a pattern-based predictor 264 comprises a visit filter 2642, a visit score determiner 2644, a visit selector 2646, and a pattern-based prediction determiner 2648. Embodiments of visits filter 2642 may use the feature similarity determinations of components 263*a* and 263*b* (or features similarity determiner 262) to filter out historical visits and retain those historical visits that have a particular feature (or features) in common with the current visit. Thus, in one embodiment, each pattern-based predictor 264 may be designed (or tuned) for determining a prediction based on a prediction model using a particular feature (or features) or feature type; for instance, there might be a predictor 264 used for determining predictions when the feature indicates a workday, or weekend, or Monday, a holiday, or arrival time, or length of stay, etc. Such a predictor 264 may utilize those historical visits having the features (similar to the current visit) corresponding to its particular prediction model. (For instance, in some embodiments, these predictors may utilize specific prediction algorithms or classification models, based on their particular type of pattern prediction (i.e., prediction model). These algorithms or models may be stored as prediction algorithms 230 in storage 225.)

Accordingly, in some embodiments, for each pattern-based predictor 264, visits filter 2642 performs visits filtering to determine a set of historical visits that are relevant to that particular predictor 264. More specifically, visit filtering may be performed such that each predictor 264 may receive a subset of historical visits with features that correspond to its prediction criteria. (For instance, a predictor 264 for determining a location prediction based on behavior features similarity for 'arrival time to work later that is than normal' receives a set of historical visits where the user arrived late for work; thus, each visit in this particular historical subset includes similar features for the location (here, work) and arrival time.) In this way, each predictor 264 may utilize a set of historical visits that are similar to the current visit, based on at least one in-common feature between the historical visits and current visit (determined by features similarity determiner 262), wherein the in-common feature (s) corresponds to prediction criteria of the predictor 264. Examples of predictors 264, may include without limitation, periodic-feature based predictors, behavior-feature based predictors (which may include behavior sequences or visitation sequence similarity), out-of-routine or uncommon behavior features (such as when a user arrives to the office late or doesn't go to the office on a workday (if this is uncommon behavior for the user), or when the user visits an uncommonly visited location) or other types of similarity-of-feature based predictors.

For each predictor 264, for the subset of historical visits determined by visit filter 2642, visit scoring may be performed. Visit score determiner 2644, in general, compares similarities of features in the current visit and the subset of historical visits (which may be considered as a comparison of contexts, in some embodiments) and scores each visit with respect to the similarity of its features. In particular, some embodiments score not only those features used for determining the subset of historical visits (e.g., a weekday or arrival time), but all (or a larger number) of features available in the current and historical visits for comparison. In some embodiments, a Boolean logic process is used (i.e., the features have to be true or have the same or similar pattern, and if this is satisfied, then a statistical difference between the particular features is determined). The differences may include, for example, differences in the arrival times, length of stay, sequence distances, etc. In an embodiment, these differences are determined and put into a sigmoid. Further, in an embodiment, a similarity threshold is used, which may be predetermined, tunable, or adaptive, or may be initially set to a value based on a population of users, may be based on empirical information learned about the particular user, for example, or may be adaptive based on the number of historical observations. In one embodiment, the threshold is 0.5 (i.e., just over fifty percent, meaning more similar than dissimilar). In another embodiment, the threshold is initially 0.6, or 0.8. The threshold may be used to determine whether a particular historical visit is "similar enough" to the current visit so as to be considered for determining a prediction. In some cases, it may be necessary to perform some further filtering or a selection of features for the similarity comparison, such as where, for a given day, a user has more than one arrival time feature (e.g., the user arrived at work twice, because they left work for lunch and then returned). Here, it may be determined that the arrival time in the morning should be used for comparison with the current visit. In some embodiments, a vector representing the similarity differences (or similarity score) may be determined by visit score determiner 2644.

Visit selector 2646 is generally responsible for determining or selecting those visits from the subset of historical visits that are most similar (or similar enough, based on a threshold) to a current visit. In some embodiments, visit selector 2646 uses a threshold, as described above, to determine those historical visits that satisfy the threshold, and are thus similar enough to be used for determining a prediction of the user's future location. In one embodiment, for each day in the user's history, the visit (or visits) with the highest score is selected. (Although the term "selector" is used herein, it is contemplated that the selection is performed by a computer-related process that does not require a person to perform the selection.) The selected historical visits determined by visit selector 2646 comprise a set of "example visits." Because a location prediction engine 260 may comprise multiple pattern-based predictors 264, a given determination about a user's future semantic location may create multiple sets of example visits, each of which may correspond to a predictor 264.

Pattern-based prediction determiner 2648 is generally responsible for determining a prediction of the user's next or future location (or locations) based on (or according to) the set of example (historical) visits determined by visit selector 2646. In some embodiments, the determined prediction of the user's next location is based on the next locations occurring after the current location indicated from each example visit, and in an embodiment is the next location occurring in the example visits with the highest observations count. (In other words, in an embodiment, the determined prediction of the user's next location is the particular next location that is predicted the most based on each member of the example visits of historical visits). For instance, in one example, suppose the set of example visits comprises ten visits and suppose a particular pattern-based prediction determiner 2648 bases a prediction on the subsequent location visited after the current location, as indicated by each of the example visits. For this example, suppose that in six of these visits, the next location visited by the user is the gym; in two of these visits, the next location is home; and in the other two visits, the next location is a restaurant. Because the highest observation count (six of the ten example visits) indicates the gym, then for this example, the predicted next location of the user is the user's gym. Those historical visits in the example visits that are consistent with the prediction (e.g., the six historical visits that support the prediction of going to the gym) comprise the "prediction support set."

In some embodiments, a prediction probability corresponding to the prediction may be determined. The prediction probability may be based on a ratio of the size of the prediction support set versus the total number of observations (historical visits in the subset determined by the visit filtering); for instance, the number of visits in the prediction support set divided by the number of total observations. Further, in some embodiments, the prediction also may comprise additional context, such as information about the user's departure time of the current location to go to the next location, arrival time at the next location, length of stay at the next location, or other contextual information as described herein. In some embodiments, this may be determined based at least in part on the times (arrival, departure, length of stay) of the prediction support set observations.

Some embodiments of pattern-based prediction determiner 2648 determine a prediction significance for the prediction, which may be determined based on a confidence interval (e.g., a binomial confidence interval) or other appropriate statistical measure. In some embodiments, a prediction confidence for a particular prediction is also determined. The prediction confidence may indicate a degree or likelihood that the prediction will occur, or in other words, the chances that the user will visit the predicted future semantic location. In some embodiments, the prediction confidence is based on the prediction probability and the prediction significance; for example, in one embodiment, the prediction confidence is determined as the product of the prediction probability and the prediction significance. As described below, in some embodiments, the prediction confidence associated with a prediction may be used to select a particular prediction from other predictions determined by the predictors 264 in location prediction engine 260. Thus, the output of each pattern-based predictor 264 is a predicted next or future location (or locations), and in some cases corresponding contextual information, such as departure time, arrival time, length of stay, etc., and/or a prediction confidence corresponding to the predicted next or future location (or locations).

Prediction selector 268 determines a prediction from among the predictions determined by each of the one or more pattern-based predictors 264. In an embodiment, an ensemble process is utilized, wherein the predictors 264 vote or weigh in, and a selection is determined based on the ensemble member predictors 264. Further, in some embodiments, individual ensemble member predictors may be weighted based on learned information about the user or of the visits. In some embodiments, once each of the one or more predictors 264 have determined a prediction, then the particular prediction that has the highest corresponding prediction confidence is selected by prediction selector 268 as the resultant next (or subsequent) predicted location (or locations). This selected future location may be considered a pattern-based (or history-based) prediction determined by location prediction engine 260. In some embodiments, the output of prediction selector 268 may be stored in pattern-based predictions 250 in user profile 240, and in some embodiments may be received by prediction conflater 220.

Prediction conflater 220, in general, is responsible for determining a predicted next or future location (or locations) by conflating a prediction, such as the pattern-based or history-based prediction (i.e., the prediction determined by prediction selector 268), and explicit information associated with the user. (The term "coherent prediction" is sometimes used herein to a comprehensive prediction that reconciles the pattern-based prediction and explicit information. Thus a coherent prediction is provided as the output of the conflation performed by prediction conflater 220.) For instance, suppose a pattern-based prediction (as determined by location prediction engine 260) determines that a user is likely to go straight home after leaving the office. (Thus, the predicted next location in this example is the user's home.) But suppose the user has a confirmed appointment after work to see a doctor, which may be indicated in the user's calendar. Then, prediction conflater 220 may determine that the user is likely to go to the appointment next (e.g., the location of the doctor's office), rather than go home. Thus, prediction conflater 220 may, in some instances, override a historical-based or pattern-based prediction determined by prediction engine 260. On the other hand, suppose the user has a recurring event on her calendar after work, but on previous occasions the user has not attended the event after work. Then prediction conflater 220 may determine that, although explicit information indicates a potential conflict with the pattern-based prediction (the user's home), the confidence is low and therefore the resulting prediction or the "coherent" prediction for the next location of the user is the user's home.

As shown in example system 200, prediction conflater 220 comprises explicit signals determiner 222, conflict level determiner 224, and next location predictor 226. Explicit signals determiner 222 generally determines one or more explicit signals, and, in some embodiments, determines a level of confidence associated with each explicit signal. (The term "explicit signal" as used herein refers to a piece or stream of explicit information and does not refer to the communication transmission.) Explicit signals determiner 222 determines an explicit signal representing explicit information associated with the user, which may be related to a pattern-based (or historical-based) prediction determined by location prediction engine 260. For instance, in some embodiments, an explicit signal may be determined based on information determined about the user for a future time corresponding with the pattern-based prediction(s). As an example, an explicit signal may indicate that the user has a calendar appointment with a doctor at a future time in which a pattern-based prediction has predicted the user to be at another location (e.g., the user's home). Explicit signals may be determined from user data provided by user-data collection component 210 and, in some instances, may be stored in a user profile associated with the user, such as user explicit signals data component 249 of user profile 240. For example, explicit signals may be determined from, by way of example and not limitation, calendar information; social media activity (which may include invitations to events, or posts or tweets about appointments or events affecting the user's schedule or location); emails (such as an email confirming booking a flight); SMS text messages (such as a text message about an appointment), voicemail, calls, and other communication; user-device interactions, including website activity (such as visiting a restaurant's website and making a reservation at the restaurant), user-purchase transactions (such as a transaction indicating purchasing tickets to a concert); location information (as described below); detected out-of-routine events; or other external events information indicating possible future activity or location associated with the user. In some embodiments, the explicit signal may be determined by extracting and/or parsing location-related information from the user-data. For example, where an SMS text message (or other communication) indicates "I'll meet out at the mall at 8 pm today," information about the user's location (the mall) and a future time (8 pm, today) may be extracted and provided as an external, explicit signal. In one embodiment, crowd-sourced information may be used to determine an explicit signal, such as information from a user's close circle of friends or co-workers. For example, if most of the user's co-workers have the same event on their calendars, such as a "team party" with an address, then an explicit signal may be inferred. (This type of explicit signal may have a lower confidence than an explicit signal determined based on user-data derived directly from the user.)

In some embodiments, location information determined from a user device associated with the user may provide an explicit signal, such as location information indicating that the user's location or bearing (direction of travel) is such that it is unlikely or even impossible that the user will travel to the next location predicted by the pattern-based prediction. (Although the pattern-based prediction may have been based on a current location of the user at the time of the prediction, this example assumes that the user is in a different location at the time conflation is performed. This could occur where the user suddenly departs the current location or when a user device now indicates the user is at the different location, for instance.)

Explicit signals determiner 222 also may determine a level of confidence associated with each explicit signal. In one embodiment, each explicit signal or piece of explicit information is evaluated by explicit signals determiner 222 to determine a confidence associated with the explicit signal. The confidence may indicate a legitimacy or authority (e.g., strength) of the explicit signal; for instance, a higher confidence may indicate that the user's future activity is more likely to be affected according to the explicit signal. As an example, a meeting request received by a user that the user has affirmatively confirmed (accepted as attending), may have a higher confidence than a meeting request received by the user that the user has responded to as tentative or has not responded to at all (an unconfirmed conflict).

Conflict level determiner 224 generally determines a level of conflict between one or more explicit signals and a pattern-based prediction. Where it is determined that a conflict does not occur for a particular pattern-based prediction, then the explicit signal(s) may be ignored with regards to that pattern-based prediction, in an embodiment. But where it is determined that a conflict may occur, then the explicit signal(s) and pattern-based prediction are conflated (or reconciled) to determine a coherent predicted semantic location. For example, an explicit signal indicating a user-accepted meeting over the exact time as a predicted next location of lunch at a restaurant, wherein the meeting is at a different location than the restaurant, may be determined has having a high level of conflict. Since the user accepted the meeting, the corresponding confidence may be high, and it may be determined (as described below in connection to next location predictor 226) that the next or future semantic location is the meeting, and further that the user will not go to lunch at the restaurant. In some instances, a partial conflict may occur. For example, suppose a user has just sent an SMS text message to a friend indicating that the user will stop by her friend's house on the way home today to pick up an item to borrow. A pattern-based prediction may have determined that the next location is the user's home; the user will arrive home at 6 PM, and will stay at home for 13 hours (until tomorrow morning, when the user goes to work). But an explicit signal, based on the text message, indicates that the user's next semantic location is the friend's house. Because the user just sent the text message, a high confidence may be determined for this explicit signal. Accordingly, conflict level determiner 224 may determine a partial conflict, and next location predictor 226 may determine that the user's next semantic location is most likely the friend's house, but that a subsequent semantic location is the user' home. Next location predictor 226 (or another component of system 200) may further determine that the user will likely arrive at her friend's house at 5:45 PM. (This may be determined, for instance, based on a pattern of departure time from work.)

Next location predictor 226, in general, is responsible for providing a coherent prediction about a next location based on the conflation. Next location predictor 226 may also determine a subsequent location (or locations) visited after the current location, but not necessarily immediately following the current location, as described previously. Thus, the term "next location" is used broadly herein.

As described above, in some instances, next location predictor 226 may determine the likely next semantic location of the user based on a level of conflict between a pattern-based (or history-based) predicted next location (such as determined by location prediction engine 260) and one or more explicit signal(s) representing explicit information associated with the user, and in some instances, a corresponding confidence regarding the accuracy or certainty of the explicit signal(s). For example, explicit signals with high confidence and high conflict may trump the pattern-based prediction, and thus the predicted next semantic location may be determined from the explicit signal(s). In particular, in one embodiment, the explicit signal having the highest confidence is used for determining the predicted next location. Alternatively, the pattern-based prediction is determined to be the next location; for example, where no explicit signal or explicit evidence is identified to contradict the pattern-based prediction, then the pattern-based prediction will be provided as the coherent prediction.

In some embodiments, where a conflict occurs, a confidence associated with the conflicting explicit signal may be compared to the prediction confidence associated with the pattern-based prediction to determine a coherent prediction regarding the user's future semantic location. Some embodiments of next location predictor 226 (or prediction conflater 220) utilize reconciliation logic 237 to reconcile conflicts and/or determine the coherent prediction. Reconciliation logic 237 may comprise rules, conditions, associations, classification models, or other criteria, and may take different forms, depending on the explicit signal(s) or pattern-based prediction. For example, reconciliation logic 237 may comprise static rules (which may be predefined or may be set based on settings or preferences in a user profile associated with the user), Boolean logic, fuzzy logic, neural network, finite state machine, support vector machine, logistic regression, clustering, or machine learning techniques, similar statistical classification processes, other rules, conditions, associations, or combinations of these. In some embodiments, where a conclusive prediction cannot be determined or where it is determined that the user is extremely out of routine, reconciliation logic 237 instructs prediction conflater 220 to return null (or in other words, prediction conflater 220 or other components of system 200 do not provide a coherent prediction in this circumstance).

Continuing with FIG. 2, example system 200 also includes one or more predicted-location consumers 270. Predicted-location consumers 270 comprise computing applications or computing services that consume the predicted future semantic location information regarding the user to provide an improved computing experience for the user. As described herein, coherent prediction(s) regarding a user's future semantic location(s) may be provided to computer applications or services (e.g., predicted-location consumers 270), which may include an aspect of a virtual assistant computer program associated with the user. In some embodiments, the coherent prediction(s) may be provided in connection with an API to facilitate their utilization by a predicted-location consumer 270. Examples of predicted-location consumers 270 may include, without limitation, calendar or scheduling applications or services, notification services, personalized content services, automation services, or other computing services that may be tailored to a user based on knowledge of the user's likely future semantic location. Some embodiments of predicted-location consumers 270 may be carried out by a virtual assistant application or service, which may be implemented as one or more computer programs (which may comprise one or more applications, services, or routines), such as an app running on a mobile device and/or in the cloud, as further described herein.

In particular, one example of a predicted-location consumer 270 comprises a content personalization service. In one embodiment of predicted-location consumers 270, a content personalization engine 271 is provided to facilitate providing a personalized user experience. Thus, content personalization engine 271 may be considered one example of an application or service (or set of applications or services) that may consume information about predictions of future semantic locations as determined by implementations of the present disclosure. At a high level, example content personalization engine 271 is responsible for generating and providing aspects of personalized user experiences, such as personalized content or tailored delivery of content to a user. The content may be provided to the user as a personalized notification (such as described in connection to presentation component 218), may be provided to an application or service of the user (such as a calendar or scheduling application), or may be provided as part of an API where it may be consumed by yet another application or service.

In one embodiment, the personalized content may include a notification, which may comprise information, a reminder, a recommendation, suggestion, request, communication-related data (e.g., an email, instant message), or includes similar content that may be provided to the user in a way that is personalized. For example, embodiments intelligently route user communications, schedule reminders, or provide notifications or other content to the user upon arrival (or just prior to or after arrival), departure (or just prior to or following a predicted departure), or at a time when the user would most likely desire to receive it. For example, upon determining that the user's next location is a grocery store, a reminder may be provided to buy milk, or a shopping list or coupon may be provided to the user. In some embodiments, based on a coherent predicted future semantic location, content may begin being loaded onto a user device for anticipated use at the future location. For instance, where it is determined that a user's next location is her grandmother's house, that the location does not have Wi-Fi access, and that an activity likely to occur at the location is looking at pictures on the user's mobile device, then recent photos from the user's cloud storage may be downloaded onto the user's mobile device in advance, at a location with better communication bandwidth. In yet another example, where it is determined that the user's next location is a particular friend's house (or it is determined that the user's friend will be at the predicted future location), a summary of recent communications with that friend may be presented. In a similar example, a user may be provided an indication of her friends that are located at (or live in) the predicted future location, and may be prompted to initiate a communication with one of those friends.

In still another example, based on knowledge of the user's likely future location, anticipated travel time or a travel route from the user's current location may be determined. In some instances, a timely reminder to leave for the next location may be provided to the user, based on the anticipated travel time. Similarly, the user may be provided with a timely notification at a current location that an accident has occurred or a bridge is under construction along the route to the predicted future location.

As another example, a predicted-location consumer 270 provides an automated service for the user, based on the user's predicted future locations. For example, where it is determined that a user's next or future location is the user's home, a service might automatically turn on the user's thermostat such that the user's home is at a desired temperature by the time the user arrives. Similarly, by accurately predicting when a user is likely to arrive or leave a location, other automation services may be provided and/or personalized to the user, such as automatically turning on/off lights, setting alarms, rerouting calls or communications, etc. In one embodiment of an automated service, a predicted-location consumer 270 comprises a bot, which may be utilized to carry out a transaction on behalf of the user. A bot is a semi-autonomous software program or routine typically designed and configured to carry out tasks oriented with a particular goal, such as booking travel, ordering a pizza, or scheduling an appointment. Thus, as one example, if it is determined that the predicted future location of the user is a particular restaurant, and explicit information indicates that the restaurant is busy, then a particular bot (a predicted-location consumer 270) may receive information about the predicted future location (including the user's likely arrival time to the future location) and automatically reserve a table for the user. In some embodiments, a virtual assistant associated with the user may engage the bot and provide the predicted future location information.

In some embodiments, content personalization engine 271 tailors content for a user to provide a personalized user experience. For example, content personalization engine 271 may generate a personalized notification to be presented to a user, which may be provided to presentation component 218. Alternatively, in other embodiments, content personalization engine 271 generates notification content and makes it available to presentation component 218, which determines when and how (i.e., what format) to present the notification based on user data. In some embodiments, by tailoring content to the user or providing a personalized computing experience according to the predicted future location, user-device performance is improved, battery-life may be better managed, and bandwidth consumption conserved. For example, as further described above, content (such as a notification or reminder) may be provided to the user at a time when it is most useful or desired by the user, which may reduce the number of notifications needed. Similarly, automation services may be more precisely controlled based on knowledge of the user's future locations.

Example system 200 also includes a presentation component 218 that is generally responsible for presenting content and related information to a user, such as the personalized content from content personalization engine 271 or content from other predicted-location consumers 270. Presentation component 218 may comprise one or more applications or services on a user device, across multiple user devices, or in the cloud. For example, in one embodiment, presentation component 218 manages the presentation of content to a user across multiple user devices associated with that user. In some embodiments, presentation component 218 may determine on which user device(s) content is presented, as well as the context of the presentation, such as how (or in what format and how much content, which can be dependent on the user device or context) it is presented, when it is presented, etc. In some embodiments, presentation component 218 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

Storage 225 generally stores information including data, computer instructions (e.g., software program instructions, routines, or services), logic, profiles and/or models used in embodiments of the disclosure described herein. In an embodiment, storage 225 comprises a data store (or computer data memory). Further, although depicted as a single data store component, storage 225 may be embodied as one or more data stores or may be in the cloud.

Some embodiments of storage 225 store pattern prediction algorithms or models 230, visits logic 235, and reconciliation logic 237, as described previously. In one embodiment, storage 225 stores one or more user profiles 240, an example embodiment of which is illustratively provided in FIG. 2. Example user profile 240 may include information associated with a particular user or, in some instances, a category of users. As shown, user profile 240 includes user's semantic locations data 242, historic location data 243, current visit data 244, user historic visits 246, user account (s) and activity data 248, user explicit signals data 249, and pattern-based predictions 250, some of which have been described previously. The information stored in user profiles 240 may be available to the routines or other components of example system 200.

User's semantic locations data 242 may comprise the semantic locations determined (as a coherent prediction of future semantic location(s)) by prediction conflater 220, and may include semantic locations frequented by a user, as described previously and referred to herein as "hubs." User's semantic locations data 242 may be provided to one or more predicted-location consumers 270 or to a virtual assistant associated with the user. User account(s) and activity data 248 generally includes user data determined from user-data collection component 210 (which in some cases may include crowdsourced data that is relevant to the particular user), and may be used for determining current and historic visit-related information, such as semantic location information, features associated with visits (past or future), and/or explicit signals, for example. User account(s) and activity data 248 also may include information about user devices accessed, used, or otherwise associated with a user, and/or information related to user accounts associated with the user; for example, online or cloud-based accounts (e.g., email, social media) such as a Microsoft® Net passport, other accounts such as entertainment or gaming-related accounts (e.g., Xbox live, Netflix, online game subscription accounts, etc.), user data relating to such accounts as user emails, texts, instant messages, calls, other communications, and other content; social network accounts and data, such as news feeds; online activity; and calendars, appointments, application data, or other user data that may be used for determining current or historic visit features or explicit signals.

Figure 3A:
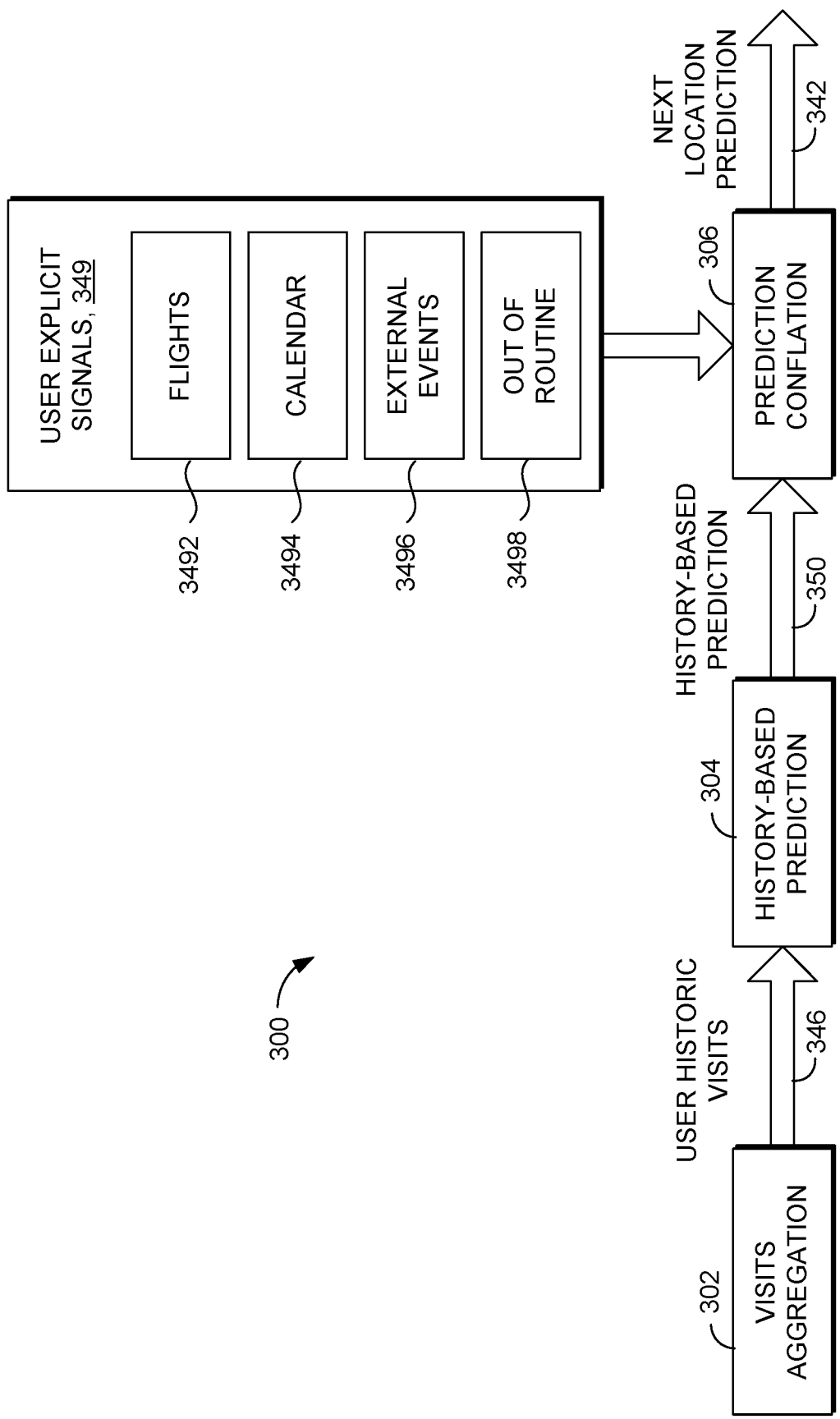
FIGS. 3A-3D depicts an example process flow for determining future semantic location information for a user, in accordance with an embodiment of the disclosure.
Figure 3B:
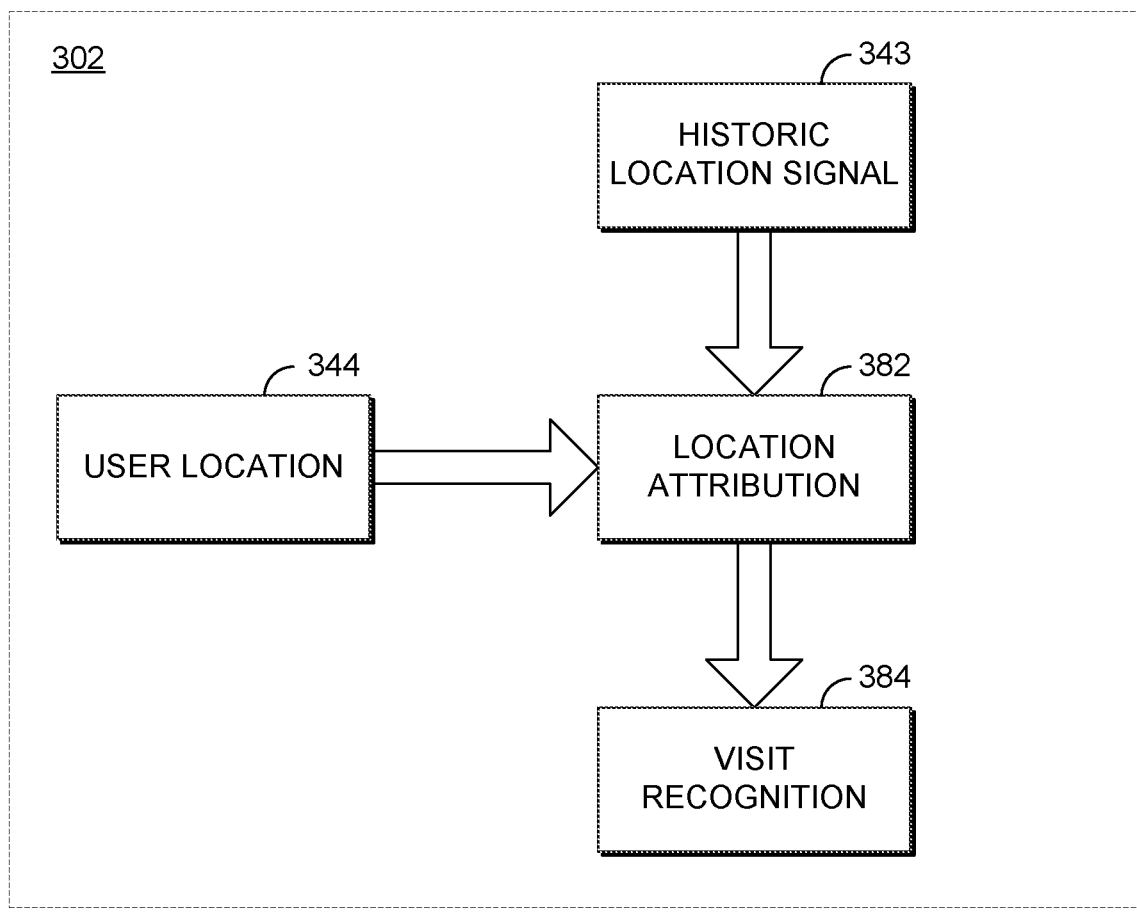
Figure 3C:
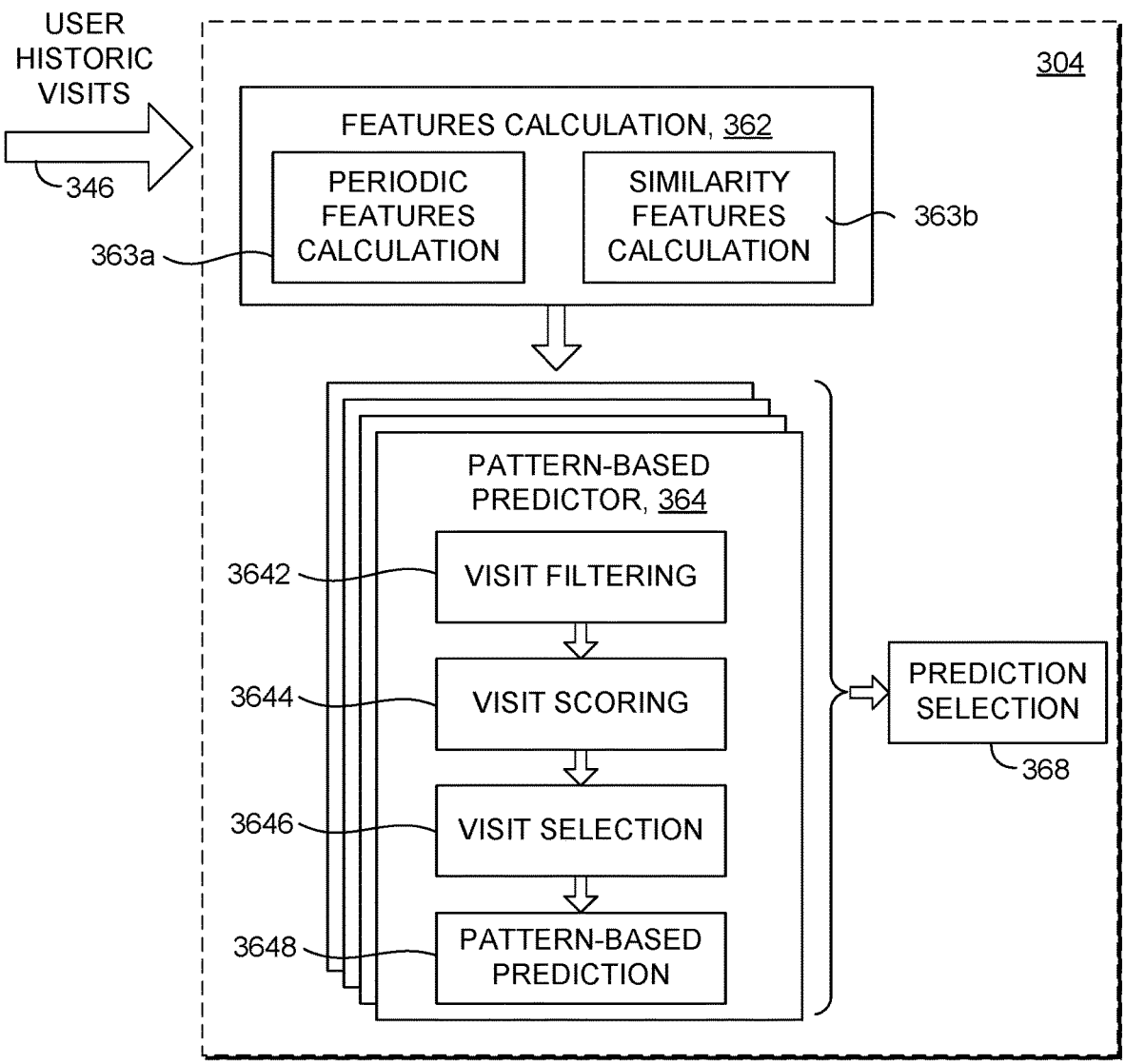
Figure 3D:
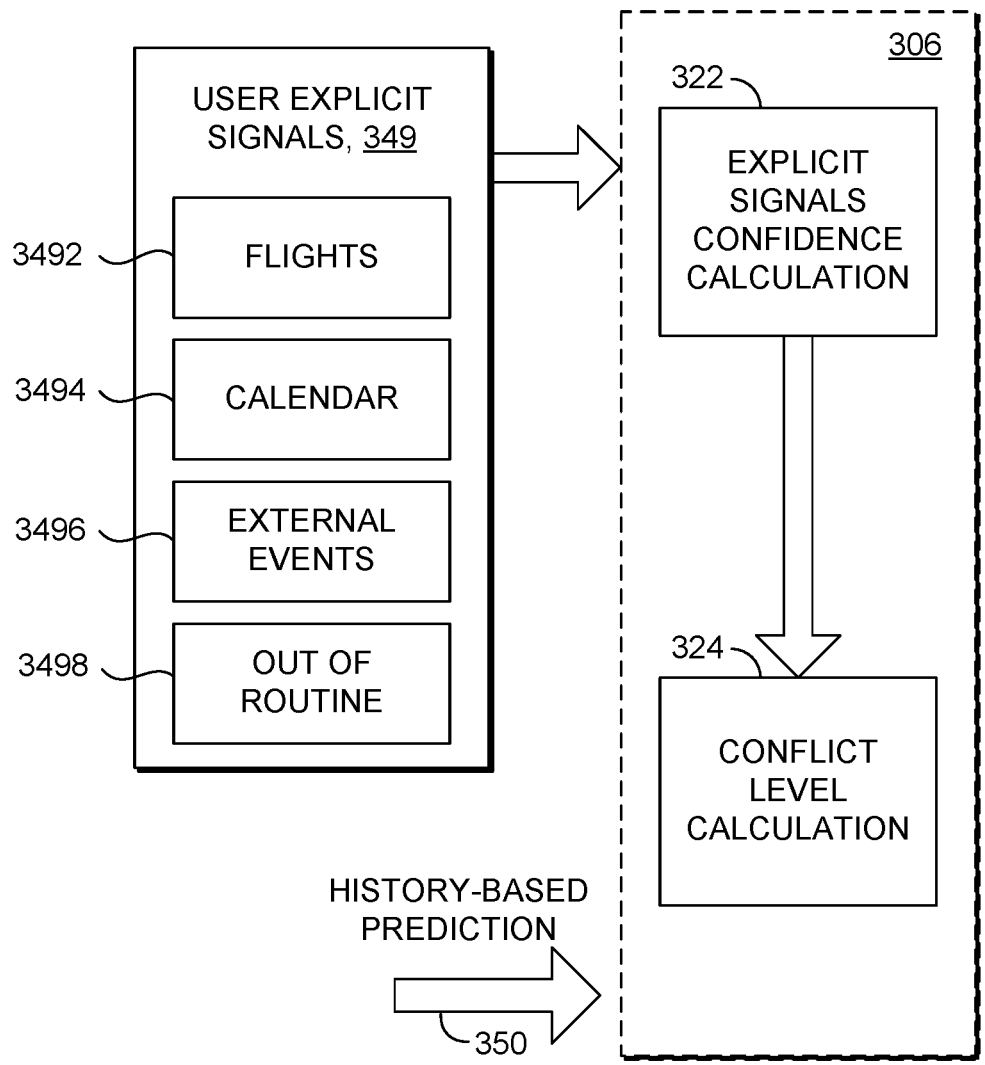

Turning now to FIGS. 3A-3D, aspects of an example process flow 300 are illustratively depicted for an embodiment of the disclosure. In particular, FIG. 3A depicts an overview of process flow 300 and each FIGS. 3B-3D depict an aspect of process flow 300. The blocks of process flow 300 (shown across FIGS. 3A-3D) that correspond to actions (or steps) to be performed (as opposed to information to be acted on) may be carried out by one or more computer applications or services, in some embodiments, including a virtual assistant, that operate on one or more user devices (such as user device 104a), servers (such as server 106), may be distributed across multiple user devices and/or servers, or may be implemented in the cloud. In one embodiment, the functions performed by the steps of process flow 300 are carried out by components of system 200, described in connection to FIG. 2.

With reference to FIG. 3A, an overview of process flow 300 is illustratively provided. At block 302, visits aggregation is performed. Visits aggregation 302 determines a current visit of the user and determines a set of historical visits 346 that are similar to the current visit. For instance, historical visits 346 include one or more features in common with a current visit. A more detailed perspective of aspects of block 302 is shown in FIG. 3B. With reference to FIG. 3B and continuing reference to FIG. 3A, visits aggregation 302 receives user location information 344 and historic location signal information 343. User location information 344 and historic location signal information 343 may be received from a user profile associated with the user; for instance, user location information 344 may be received from current visit data 244 of user profile 240, described in FIG. 2, and historic location signal information 343 may be received from historic location data 243 of user profile 240. Both historic location signal information 343 and user location information 344 may be determined from user data obtained by one or more user-data collection components 210, as described in FIG. 2.

Location attribution 382 performs location attribution using the user location information 344 and historic location signal 343. In one embodiment, location attribution 382 is carried out by location attribution component 282 or visits monitor 280 of system 200, and may further include functionality described in connection to visits monitor 280. Based on location attribution 382, visit recognition 384 is performed to identify current and/or historical visits to the same location as the current visit. In one embodiment, visit recognition 384 determines a visit based on user data indicating that the user is/was in the same approximate location (e.g., a geographic location or semantic location) for a timeframe. Further, in some instances, consecutive (or substantially consecutive) user location data near the same location is concatenated, and in some cases outliers are filtered out, to facilitate identifying a visit and duration of the visit. Some embodiments of visit recognition 384 use visit logic, such as visit logic 235, described in connection to FIG. 2. In one embodiment, the operations performed in visit recognition 384 are carried out by visit identifier 284 or visits monitor 280 of system 200, and may further include operations or functionality of embodiments described in connection to visits monitor 280.

Returning to FIG. 3A, the output of visits aggregation 302 includes a set of historical visits 346, which is provided to history-based prediction 304. Turning to FIG. 3C, and with continuing reference to FIG. 3A, aspects of history-based prediction 304 are shown. At block 362, features calculation is performed on the received set of user historic visits 346. (The user historic visits may be received directly from the output of visits aggregation 302 or from storage, such as user historic visits component 246 of user profile 240, described in FIG. 2.) Features calculation 362 determines features in the set of user historic visits 346 that are similar to features of the current visit. (Although the term "calculation" is used in regards to this block, it is clear from the description provided herein that the operations performed by features calculation 362 may comprise more than merely mathematical operations.)

In some embodiments, the similar or in-common features determined by features calculation 362 are used by one or more pattern-based predictors 364 to filter the set of user-historic visits 346 in order to determine a subset of historic visits that have one or more features in common with the current feature (or put another way, a subset of historic visits that share a context with the current visit). In some embodiments, such as the embodiment depicted in example process flow 300, features calculation 362 determines similarity among visits of different types of features or based on feature-based patterns of the visits. In particular, as shown in process flow 300, features calculation 362 comprises a periodic features calculation 363a and a similarity features calculation 363b. As described previously, periodic features may comprise features of visits that occur approximately periodically. Similarity features may comprise features based on similar behavior (such as similar late arrival time, length of stay, previous location visited, etc.), or other similar features other than periodic features (for instance, similar uncommon or out-of-routine features). Some embodiments of periodic features calculation 363a and a similarity features calculation 363b may be performed by a periodic features determiner 263a and a behavior similarity features determiner 263b, respectively, such as described in connection to FIG. 2. Further, in some embodiments, the operations performed in features calculation 362 are carried out by features similarity determiner 262 or location prediction engine 260 of system 200, and may include operations or functionality of embodiments described in connection to features similarity determiner 262.

One or more pattern-based predictors 364 receive user historic visits information 346, current visit information, and feature-similarity information determined from features calculation 362. Using this information, each of the pattern-based predictors 364 determines a pattern-based prediction regarding a next possible location of the user. As shown in FIG. 3C, a pattern based predictor 264 comprises steps including visit filtering 3642, visit scoring 3644, visit selection 346, and patter-based prediction 3648. Some embodiments of a pattern-based predictor 364 are implemented using a patter-based predictor 264, described in connection to FIG. 2. Additionally, in some embodiments, the operations performed by visit filtering 3642, visit scoring 3644, visit selection 346, and patter-based prediction 3648 are carried out by visit filter 2642, visit score determiner 2644, visit selector 2648, and pattern-based prediction determiner 2648, respectively, and may include embodiments described in connection to pattern-based predictors 264 or system 200.

Some embodiments of history-based prediction 304 determine multiple subsets of historic visits, such that each subset is similar to the current visit based on at least one in-common feature similarity (determined by features calculation 362). For example, the outputs of periodic features calculation 363a may be utilized by a visit filtering 3642 step to determine a first subset of historic visits that occur on the same day of the week as the current visit for a first pattern-based predictor 364, and utilized by another visit filtering 3642 step to determine by a second subset of historic visits that begin at approximately the same time of day as the current visit for a second pattern-based predictor 364. Likewise, the outputs of similarity features calculation 363b may be utilized in a similar manner to determine a third subset of historic visits that include a similar previous location visited by the user for a third pattern-based predictor 364, and a fourth subset of historic visits that include a feature related to an out-of-routine event for a fourth pattern-based predictor 364. Each of the four pattern-based predictors in this example, may then perform visit scoring 3644, visit selection 3646, and pattern-based prediction 3648 to determine a pattern-based prediction regarding a next possible location of the user. As described above, embodiments of blocks 3642, 3644, 3646, and 3648 may comprise an embodiment described in connection to visit filter 2642, visit score determiner 2644, visit selector 2648, and pattern-based prediction determiner 2648 of system 200.

At block 368, a pattern-based prediction is selected from among the pattern-based predictions determined by the one or more pattern-based predictors 364. The selected pattern-based prediction comprises a history-based prediction 350 (shown in FIGS. 3A and 3D). In an embodiment, the operations performed in prediction selection 368 are carried out by a prediction selector 268 or location prediction engine 260 of system 200, and may include operations or functionality of embodiments described in connection to prediction selector 268 or location prediction engine 260. (Although the term "selection" is used by visit selection 3646 and prediction selection 368, it is contemplated that the selection is performed by a computer-related process that does not require a person to perform the selection.) Further, in some embodiments, the history-based prediction 350 has a corresponding prediction confidence, which may be determined as described in connection to pattern-based prediction determiner 2648 and prediction selector 268 of system 200.

Returning to FIG. 3A, the output of history-based prediction 304 includes a history-based prediction 350, which is provided to prediction conflation 306. Prediction conflation 306 also receives one or more user explicit signals 349, such as explicit signals regarding flights (3492), the user's calendar (3494), external events (3496), or out of routine information (3498), for example. Turning to FIG. 3D, and with continuing reference to FIG. 3A, aspects of prediction conflation 306 are shown. One or more user explicit signals 349 and history-based prediction 350 are received by prediction conflation 306. At block 322, a confidence is calculated for each of the user explicit signals 349. At block 324, a conflict level is calculated for each of the explicit signals 349 versus the history-based prediction 350. Embodiments of bock 322 may be carried out by an explicit signals determiner 222 or prediction conflater 220, of system 200, and may include operations or functionality of embodiments described in connection to explicit signals determiner 222 or prediction conflater 220. Similarly, embodiments of bock 324 may be carried out by a conflict level determiner 224 or prediction conflater 220, of system 200, and may include operations or functionality of embodiments described in connection to conflict level determiner 224 or prediction conflater 220.

Based in part on the conflict level calculation, a next location prediction 342 is determined. The next location prediction 342 comprises a coherent prediction about a next (or subsequent) semantic location of the user. Some embodiments of prediction conflation 306 may determine the next location prediction 342 as described in connection with next location predictor 226 (or prediction conflation 220) for determining the coherent prediction. For instance, in an embodiment, next location prediction 342 is determined based on a level of conflict between history-based prediction 350 and one or more explicit signal(s) 349, and in some instances, a corresponding confidence regarding the accuracy or certainty of the explicit signal(s)). In some embodiments, where a conflict occurs between an explicit signal 349 and a history-based prediction 350, the explicit signal confidence is compared to a prediction confidence associated with history-based prediction 350 to determine a coherent prediction regarding the user's future semantic location.

Further, some embodiments of prediction conflation 306 also determine features or contextual information associated with the coherent prediction, such as likely arrival time to the future semantic location, likely departure time from the current location (or the preceding location in the case of a coherent prediction about a series or sequence of future locations), duration or stay at the future location, user activities, events, other people, or other related information as describe herein. Some embodiments of process flow 350 may provide the determined coherent prediction about a next (or subsequent) semantic location of the user and related information (if determined) to one or more predicted-location consumers (not shown), such as consumers 270 described in connection to FIG. 2.

Figure 4:
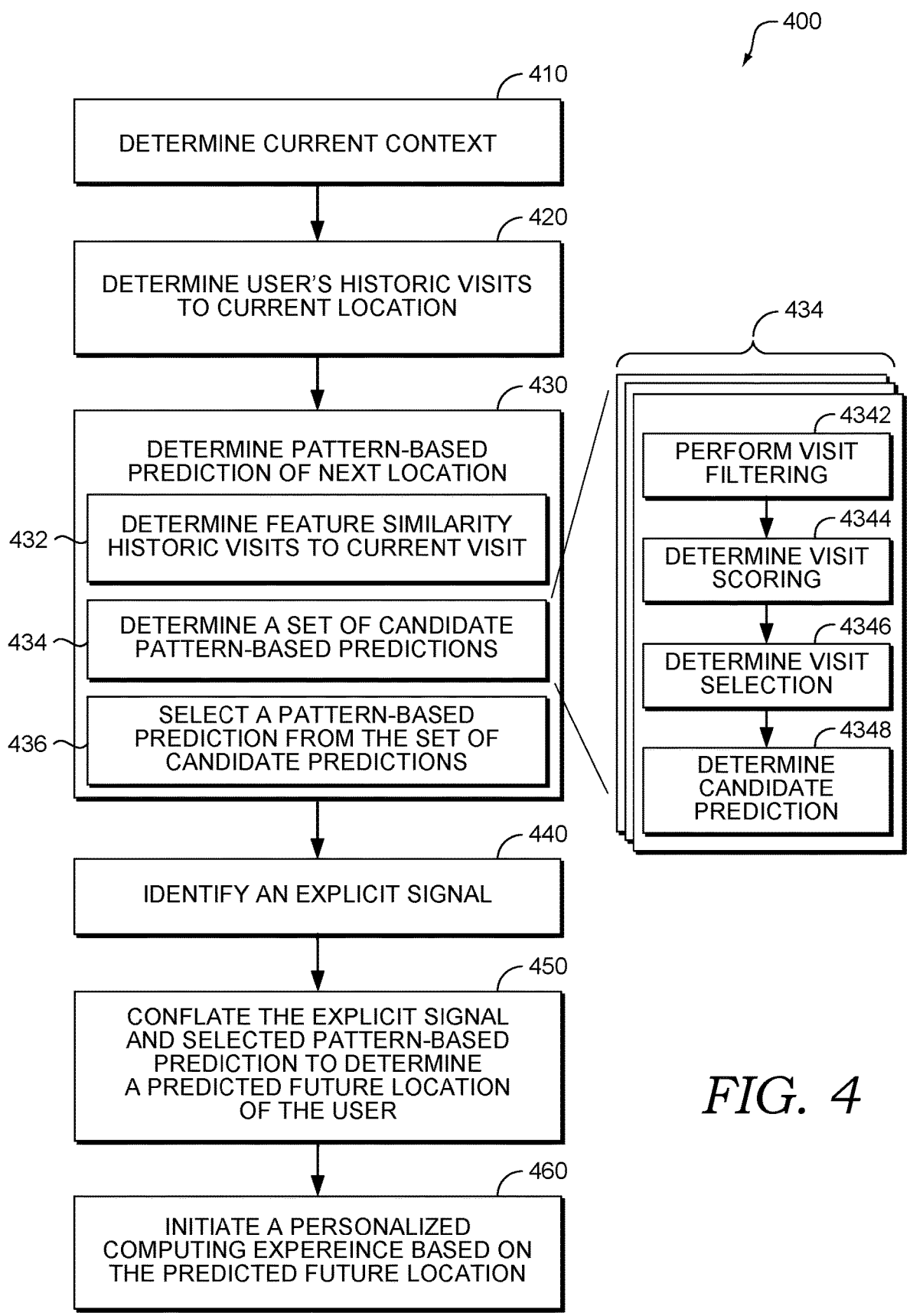
FIGS. 4-5 depict flow diagrams of methods for determining predicted future semantic location information for a user, in accordance with an embodiment of the disclosure.
Figure 5:
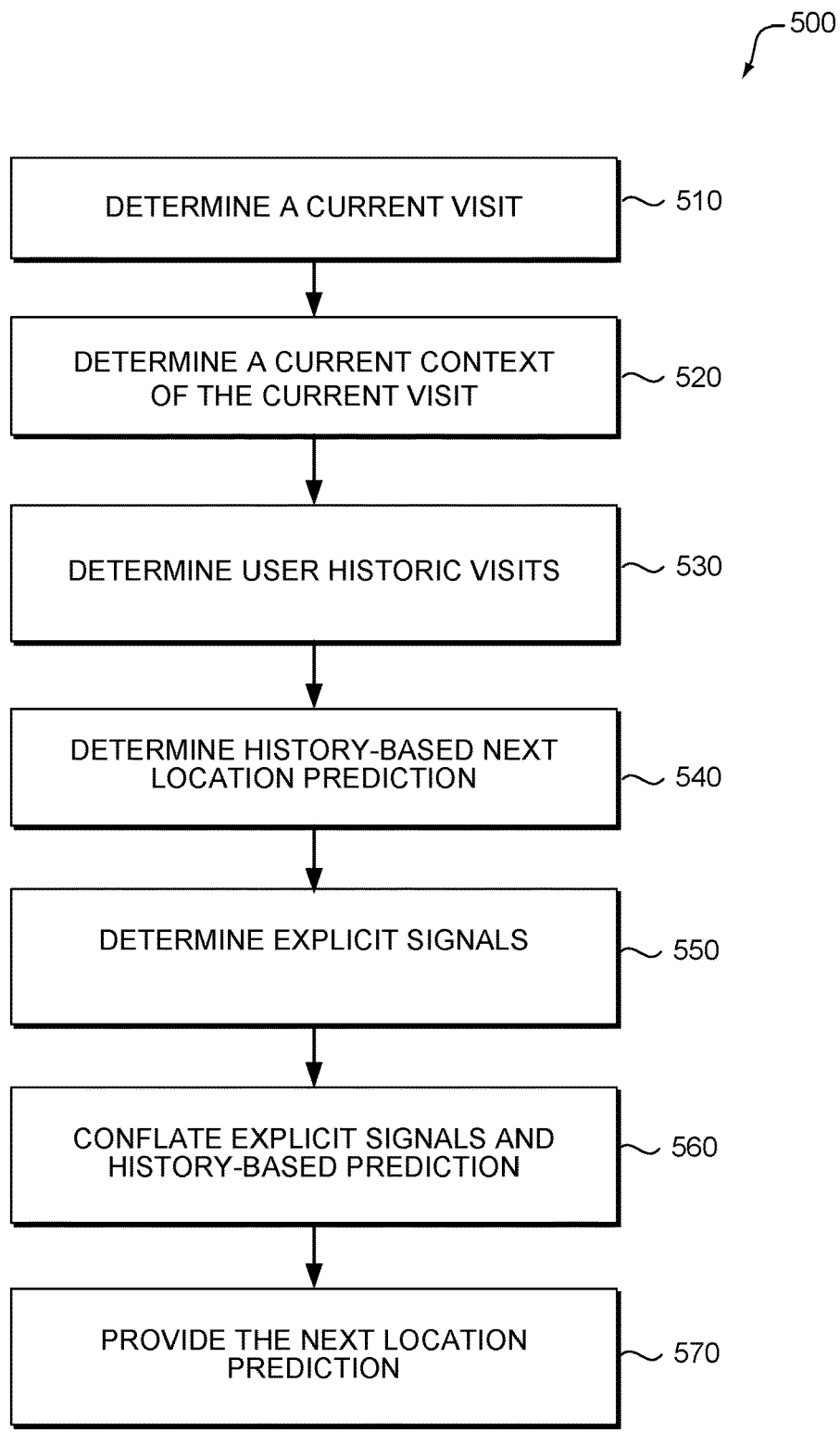

Turning now to FIGS. 4 and 5, flow diagrams are provided illustrating examples of a method 400 for providing a personalized computing experience to a user based on a predicted next or future semantic location of the user, and a method 500 for determining and utilizing a prediction of a next or future location of a user. Each block or step of method 400, method 500, and other methods or process flows described herein comprises a computing process that may be performed using any combination of hardware, firmware, and/or software. For instance, various functions may be carried out by a processor executing instructions stored in computer memory. In an embodiment, method 400 and 500 may be implemented using the components described in system 200. The methods may be embodied as computer-usable instructions stored on computer storage media. The methods also may be carried out by a computer program such as a virtual assistant computing service, a distributed application, a stand-alone application, a service or hosted service (stand-alone or in combination with another hosted service), or a plug-in to another product, to name a few.

With reference to FIG. 4, at step 410 determine a current context for a user. Embodiments of step 410 may determine a context associated with a user's current location. The context may comprise, for example, information about the user's current geographical location, whether the user is visiting the location (i.e., whether a current visit is occurring) or passing through the current location, and other information related to a current visit, such as the arrival time, the user's previous location(s), date, time, day of the week, other users at the current location, user activity detected, or other current context of information for determining visit features, as described herein. Embodiments of step 410 may receive user data (which may include current and historic user data) for determining a current context, and if a visit is occurring, may determine the current context for the current visit. The user data may be received from a user-data collection component 210 and/or a user profile 240 associated with the user. In an embodiment of step 410, where a current visit is identified, step 410 further comprises determining a set of features associated with the current visit. In some embodiments, contextual information associated with a visit may be extracted from user data related to the visit, and used for determining a current context, which may include features about the current visit, such as described in connection to contextual information extractor 286 in system 200. Embodiments of step 410 may be carried out by visits monitor 280 of system 200, described in connection to FIG. 2. Additional details regarding embodiments of step 410 are described in connection to visits monitor 280 of system 200.

At step 420, the user's historic visits to the current location are determined Embodiments of step 420 determine a set of historic visits to the same or approximate location of the user's current location, determined in step 410. The set of similar historic visits may be determined from historic location data associated with the user, which may be accessed in a log of information, such as historic location data 243 in user profile 240, described in FIG. 2. Embodiments of step 420 may be carried out by visits monitor 280 of system 200, also described in connection to FIG. 2. Further details regarding embodiments of step 420 for determining the user's historic visits to the user's current location, are described in connection to visits monitor 280 of system 200.

At step 430, a pattern-based prediction for the user's next (or future) location is determined Embodiments of step 430 determine a pattern-based prediction (sometimes called a "history-based prediction") based on the set of historic visits determined in step 420 and the current context determined in step 410. In some embodiments of step 430, a set of one or more candidate pattern-based predictions are determined such that each candidate prediction is determined using a subset of the historic visits set, the subset having at least one feature (or context) in common with the current visit. In some embodiments, the at least one common feature is based on a periodic feature pattern or behavior feature pattern, such as described in connection to feature similarity determiner 262 in FIG. 2. From this set of candidate predictions, a particular candidate prediction then may be selected as the pattern-based prediction determined in step 430. In some embodiments, the particular candidate prediction is selected based on a corresponding prediction confidence determined with each candidate prediction. For example, in one embodiment, each candidate prediction is determined with a corresponding prediction confidence, and candidate prediction with the highest prediction confidence is selected as the pattern-based prediction of step 430. Some embodiments of step 430 (or method 400) determine multiple pattern-based predictions from the set of candidate predictions.

As shown in example method 400, one embodiment of step 430 comprises sub-steps 432, 434, and 436. At sub-step 432, determine feature (or context) similarity of historic visits to the current visit (or current context). Embodiments of step 432 identify similar or "in-common" features in historic visits and the current visit. In some embodiments, the similar features may be based on behavior similarity or periodic similarity, such as described in connection to feature similarity determiner 262 in FIG. 2. Some embodiments of sub-step 432 determine a visitation sequence similarity (e.g. the sequence of the last K locations the user visited prior to current visit (or historic visit) based on the Levenschtein distance between the historical visit (the observed visit) and current visits sequences.

Some embodiments of sub-step 432 determine a subset of historic visits having at least one feature in common with the current visit. For example, one subset may include historic visits on the same day as the current visit; another subset may include historic visits having the same preceding location visited by the user as the current visit; still another subset may include historic visits having the same approximate arrival time to the location as the user's arrival time to the current visit. Each subset of historic visits may be used in sub-step 434 to determine a candidate prediction, based on the feature similarity pattern of the subset (thus the term "pattern-based" prediction).

At sub-step 434, a set of candidate pattern-based predictions is determined Embodiments of sub-step 434 determine a set of candidate predictions regarding the user's next (or future) location, and each candidate prediction may be determined based on a subset of historic visits that have a particular feature pattern (or context pattern) in common with the current visit. In some embodiments, the predicted future location is determined based on the subsequent or next location(s) visited by the user in the subset of historic visits, as described herein.

As shown in example method 400, sub-step 434 comprises sub-steps 4342-4348 for determining a particular candidate pattern-based prediction. Thus it is contemplated that in some embodiments, sub-step 434 may be performed multiple times; sub-steps 4342-4348 may be performed for each candidate prediction to be determined. At sub-step 4342, visit filtering is performed. The set of historic visits determined in step 420 may be filtered to identify a subset of historic visits having one or more particular similar feature pattern(s) in common with the current visit, such as determined in sub-step 432. For example, sub-step 4342 may determine a subset of historic visits that comprises those historic visits that occurred on the same day of the week as the current visit. Some embodiments of sub-step 4342 may be carried out by pattern-based predictors 264 or visit filter 2642 of system 200, described in connection to system 200 (FIG. 2). Additional details regarding embodiments of sub-step 4342 are described in connection to visit filter 2642 of system 200 and visit filtering 3642 of process flow 300.

At sub-step 4344, the subset of historic visits is scored with respect to similarity to the current visit. Embodiments of sub-step 4344 determine a similarity score for each historic visit, in the subset of historic visits determined in sub-step 4342, to the current visit (or current context). In some embodiments, each historic visit is scored based on the number of features in common with the current visit (regardless of the particular feature(s) used to determine the subset in sub-step 4342) and/or based on a statistical similarity of its features to features of the current visit. For example, in an embodiment where a visitation sequence similarity was determined in sub-step 432 and a Levenschtein distance (or similar statistical similarity value) is available, then this statistical distance may be utilized to score the similarity of the historic visit to the current visit. Some embodiments of sub-step 4344 may be carried out by pattern-based predictors 264 or visit score determiner 2644 of system 200, described in connection to system 200 (FIG. 2). Additional details regarding embodiments of sub-step 4344 are described in connection to visit score determiner 2644 of system 200 and visit scoring 3644 of process flow 300.

At sub-step 4346, visit selection is determined. Embodiments of step 4346 determine, from the subset of historic visits determined in sub-step 4344, a set of example visits that are sufficiently similar to the current visit, based on their similarity scores. Some embodiments of sub-step 4346 use a similarity threshold, such as described in connection to predictor 264 in system 200 (FIG. 2.), to determine those historic visits that re sufficiently similar to the current visit. In particular, the historic visits that satisfy the threshold are determined to be sufficiently similar and may be utilized in sub-step 4348 or determining a candidate prediction of a future location. For a particular predictor determining a candidate prediction, the set of historic visits that satisfy the similarity threshold is referred to as the example set. Thus each member of the example set of historic visits includes at least one feature or context in-common with the current visit or sufficiently similar to the current visit, based on a similarity score. In one embodiment of sub-step 4346, for each day of the historic visits, the visit (or visits) on a particular day having the highest score, among other visits that day, is selected. (Although the term "selection" is used herein, it is contemplated that the selection is performed by a computer-related process that does not require a person to perform the selection.) As previously described herein, the similarity threshold may be predetermined, tunable, or adaptive, or may be initially set to a value based on a population of users, may be based on empirical information learned about the particular user, for example, or may be adaptive based on the number of historical observations. Some embodiments of sub-step 4346 may be carried out by pattern-based predictors 264 or visit selector determiner 2646 of system 200, described in connection to system 200 (FIG. 2). Additional details regarding embodiments of sub-step 4346 are described in connection to pattern-based predictors 264 and visit selector determiner 2646 of system 200, and visit selection 3646 of process flow 300.

At sub-step 4348, a candidate prediction is determined. Embodiments of sub-step 4348 determine a candidate pattern-based prediction regarding a user's next or future location (or locations) based on the example set of historic visits determined in sub-step 4346. Further, in some embodiments, sub-step 4348 also determines contextual information related to the candidate prediction, such as arrival time at the future location, departure time from the current location, length of stay at the future location, etc. In some embodiments, the candidate prediction determined in sub-step 4348 is determined based on the next location(s) occurring after the current location indicated from each example visit. In one embodiment, the candidate prediction is determined as the next location(s) occurring in the example visits having the highest observations count, such as described in connection to pattern-based prediction determiner 2648 in system 200 (FIG. 2). Those historic visits in the set of example visits that are consistent with the candidate prediction determined in sub-step 4348, such as those particular example visits that have an observation that contributes to the highest observation count, comprise the "prediction support set" of historic visits.

In some embodiments of sub-step 4348, a prediction confidence corresponding to the candidate prediction is also determined. The prediction confidence may indicate a degree or likelihood that the prediction will occur (or in other words, the likelihood that the user will visit the predicted future location(s).) The prediction confidence may be determined as described in connection with pattern-based prediction determiner 2648 in system 200; for instance, in one embodiment, the prediction confidence is determined as product of a prediction probability and a prediction significance corresponding to the candidate prediction, as described in an embodiment provided in connection with pattern-based prediction determiner 2648. Some embodiments of sub-step 4348 may be carried out by pattern-based predictors 264 or pattern-based prediction determiner 2648 of system 200, described in connection to system 200 (FIG. 2). Additional details regarding embodiments of sub-step 4348 are described in connection to pattern-based predictors 264 and pattern-based prediction determiner 2648 of system 200, and pattern-based prediction 3648 of process flow 300.

Returning to sub-step 434, the candidate pattern-based predictions determined in sub-step 434 are used to sub-step 436. At sub-step 436, a pattern-based prediction is selected from the set of candidate predictions determined in sub-step 434. Some embodiments of sub-step 436 select the candidate prediction having the highest corresponding prediction confidence. Some embodiments of sub-step 436 utilize an ensemble selection process, whereby each of the candidate predictions vote or weigh in, and a particular candidate prediction is selected based on this. Further, in some embodiments, individual ensemble member predictors may be weighted based on learned information about the user or of the visits. The output of sub-step 434 (and step 430) comprises a pattern-based prediction for a next or future location (or locations) of the user, and may also include related contextual information (e.g., arrival time at the future location, departure time from the current location, length of stay, user activity at the future location, or examples as described herein.) Some embodiments of step 430, and sub-sets 432-436, may be carried out by location prediction engine 260, described in connection to system 200 (FIG. 2). Additional details regarding embodiments of step 430 and sub-sets 432-436 are described in connection to location prediction engine 260 of system 200 and history-based prediction 304 of process flow 300. According to some embodiments of method 400, the pattern-based prediction determined in step 430 is provided as a coherent prediction of the user's next or future location and is utilized in step 460. Thus some embodiments of method 400 do not include identifying explicit signals (step 440) nor performing conflation (step 450).

At step 440, an explicit signal is determined. As described herein, an explicit signal comprises information that may impact a user's future location(s), including context or features associated with the future location(s), such as arrival time or length of stay, for instance. For example, an explicit signal may comprise information regarding a scheduled meeting on a user's calendar or an email received by the user regarding upcoming flight. Some embodiments of step 440 determine an explicit signal based on user data received from user-data collection component 210, which may include information sensed or otherwise determined from user account(s)/activity data 248, described in connection to system 200. In some embodiments, an explicit signal may be determined based on information determined about the user for a future time corresponding with the pattern-based prediction(s) determined in step 430.

Further, some embodiments of step 440 also determine a level of confidence associated with each explicit signal. The confidence level may indicate a legitimacy or authority (e.g., strength) of the particular explicit signal; for instance, a higher confidence may indicate that the user's future activity is more likely to be affected according to the explicit signal. Thus in some embodiments, the explicit signal confidence may be utilized when conflating an explicit signal with a pattern-based prediction by providing an indication of the likelihood that the future location corresponding to the explicit signal will be visited by the user rather than the future location indicated in the pattern-based prediction. The determined explicit signals and corresponding confidence(s) (if determined) may be stored user explicit signals data 249 of user profile 240. Some embodiments of step 440 are performed by an explicit signals determiner 222 or a prediction conflater 220, described in connection to system 200 (FIG. 2). Additional details regarding embodiments of step 440 are described in connection to prediction conflater 220 of system 200 and prediction conflation 306 of process flow 300.

At step 450, conflate the explicit signal and pattern-based prediction to determine a predicted future location of the user. Embodiments of step 450 perform conflation on the explicit signal(s) determined in step 440 (if there are any explicit signals) and the pattern-based prediction determined in step 430 to determine a coherent prediction of the next or future location (or locations) of the user. The coherent prediction of the next or future location (or locations) may comprise a semantic location and include related contextual information about the location. In some embodiments of step 450, an explicit signal confidence determined in step 440 may be utilized when conflating an explicit signal with a pattern-based prediction by providing an indication of the likelihood that the future location corresponding to the explicit signal will be visited by the user rather than the future location indicated in the pattern-based prediction.

Some embodiments of step 450 determine a level of conflict between any explicit signals determined in step 440 and the pattern-based prediction from step 430. If there is no conflict, then the pattern-based prediction may be determined as the future location. On the other hand, if conflict is determined (for instance, where the explicit signal indicates the user will be at a first location or context and the pattern-based prediction indicates the user will be in a different location or context), then based on the level of conflict (and in some instances the confidence of the explicit signal), prediction conflation may: override the pattern-based prediction with the location information and context derived from the explicit signal; may modify the pattern-based prediction based according to the explicit signal (for instance the user may still visit the location predicted by the pattern-based prediction, but may visit that location after the location corresponding to the explicit signal); or may determine that the explicit signal will likely not impact the pattern-based prediction and thus provide the pattern-based prediction as a coherent prediction. Some embodiments of step 450 further determine contextual information related to the coherent predicted next or future location, such as arrival time, length of stay, venue, user activities likely to be performed at the location, departure from the current location, other people (such as friends or contacts of the user) who may be present at the location, or other contextual information, as described herein. Some embodiments of step 450 are performed by a prediction conflater 220, described in connection to system 200 (FIG. 2). Additional details regarding embodiments of step 440 are described in connection to prediction conflater 220 of system 200 and prediction conflation 306 of process flow 300.

At step 460, a personalized computing experience is initiated based on the predicted future location determined in step 450. Embodiments of step 460 utilize the determined future location to provide a personalized or tailored computing experience to the user, which may be facilitated using one or more predicted-location consumers 270, described in system 200. For example, as described herein, a coherent prediction regarding a user's future location(s), determined in step 450, may be provided to computer applications or services, such as a predicted-location consumer, which may include an aspect of a virtual assistant computer program associated with the user. Some embodiments of step 460 may utilize an API to facilitate consumption of the predicted future location by a computing application or service, such as a predicted-location consumer. Examples of personalized computing experiences initiated in step 460 may include, without limitation, calendar or scheduling applications or services, notification or reminder services, content personalization service, automation services (which may include bots), or other computing services that may be tailored to a user based on knowledge of the user's likely next or future location. Some embodiments of step 460 are performed by a virtual assistant program, as described herein, and/or a predicted-location consumer 270, described in connection to system 200 (FIG. 2). Additional details regarding embodiments of step 460 are described in connection to predicted-location consumers 270 of system 200.

Turning now to FIG. 5, a flow diagram is provided illustrating an example method 500 for determining and utilizing a prediction of a next or future location of a user. At step 510, a current visit is determined Embodiments of step 510 determine that a user is currently visiting a location. In some embodiments a visit may be determined from user-data indicating location information about the user. For example, user data indicating that a user has been in the same approximate geographical location for duration of time may indicate a visit. One embodiment of step 510 determines a visit by concatenating consecutive (or substantially consecutive) user location data indicating the user is near the same approximate location, and in some cases filtering out outliers. Embodiments of step 510 may be carried out by location attribution 282 and visit identifier 284 or visits monitor 280 of system 200, described in connection to FIG. 2. Additional details regarding embodiments of step 510 are described in connection to visits monitor 280 of system 200.

At step 520, determine a current context of the current visit. Embodiments of step 520 determine a context of the visit determined in step 510. As described herein, a context may comprise, for example, information about the user's current geographical location, information related to a current visit, such as the arrival time, the user's previous location(s), date, time, day of the week, other users at the current location, user activity detected, venue visited at the location, or other current context of information for determining visit features, as described herein. In some embodiments, determining a context comprises determining one or more features associated with the visit. Further, in some embodiments, contextual information associated with the visit may be extracted from user data related to the current visit, and used for determining current context, which may include features about the current visit. Additional details regarding embodiments of step 520 are described in connection to visits monitor 280 of system 200. Some embodiments of step 520 may be performed as described in step 410 of method 400.

At step 530, determine user historic visits to the current location. Embodiments of step 530 determine a set of historic visits to the same or approximate location of the location of the current visit determined in step 510. Some embodiments of step 530 comprise performing visit aggregation, such as described in connection with process flow 300 (FIGS. 3A and 3B). Some embodiments of step 530 may be performed as described in step 420 of method 400.

At step 540, determine a history-based prediction for the next (or future) location of the user. Embodiments of step 540 determine a prediction of the user's next or future location based on a similarity patterns identified in historic visits (determined in step 530) with respect to the current visit (determined in step 510). In some embodiments of step 540, a set of one or more candidate predictions are determined such that each candidate prediction is determined using a subset of the historic visits set, the subset having at least one feature (or context) in common with the current visit. For example, the at least one common feature may be based on a periodic feature similarity or behavior feature similarity, such as described in connection to feature similarity determiner 262 in FIG. 2. In these embodiments, a particular candidate prediction may be selected form the set of candidate predictions, as the pattern-based prediction determined in step 540. In an embodiment, the particular candidate prediction is selected based on a corresponding prediction confidence determined with each candidate prediction, such as described in connection to pattern-based predictors 264 of system 200. Some embodiments of step 540 may be performed as described in step 430 of method 400, including the sub-steps of step 430.

At step 550, determine explicit signals. Embodiments of step 550 determine one or more explicit signals of information that may impact a user's future location(s), which may include the context or features associated with the future location(s). In some embodiments, an explicit signal may be determined based on information determined about the user for a future time corresponding with the history-based prediction(s) determined in step 540. Embodiments of step 550 also may determine a level of confidence associated with the explicit signal(s), which may be used for determining a likelihood that the explicit signal will impact the user's future location in regard to the future location(s) prediction determined in step 540. Some embodiments of step 550 may be performed as described in step 440 of method 400.

At step 560, conflate the explicit signals and history based prediction. Embodiments of step 560 perform conflation on the one or more explicit signals determined in step 550 with the history-based next location prediction determined in step 540 to determine a coherent prediction of the next or future location (or locations) of the user. Additionally, some embodiments of step 560 further determine related contextual information about the next or future location, such as arrival time, length of stay, venue, user activities likely to be performed at the location, departure from the current location, other people (such as friends or contacts of the user) who may be present at the location, or other contextual information, as described herein. In some embodiments of step 560, an explicit signal confidence determined in step 5500 may be utilized when conflating an explicit signal with a history-based prediction by providing an indication of the likelihood that the future location corresponding to the explicit signal will be visited by the user rather than the future location indicated in the pattern-based prediction. Some embodiments of step 560 may be performed as described in step 450 of method 400.

At step 570, the coherent predicted next (or future) location for the user is provided. The predicted next or future location may comprise a semantic location and include related contextual information about the location. Some embodiments of step 570 comprise utilizing the coherent prediction regarding a user's future location(s), determined in step 560, by one or more computer applications or services, such as a predicted-location consumer, described in connection to system 200. For example, some embodiments of step 570 utilize the determined future location to provide a personalized or tailored computing experience to the user. Some embodiments of step 570 may provide the coherent predicted next (or future) location via an API to facilitate consumption of the predicted future location by a computing application or service, such as a predicted-location consumer. Some embodiments of step 570 may be performed as described in step 460 of method 400. Additional details regarding embodiments of step 570 are described in connection to predicted-location consumers 270 of system 200.

Accordingly, we have described various aspects of technology directed to systems and methods for providing predicted future semantic location information for a user. It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the technologies described herein in any way, and in fact, the steps may occur in a variety of different sequences within embodiments hereof. Such variations and combinations thereof are also contemplated to be within the scope of embodiments of the disclosure.

Figure 6:
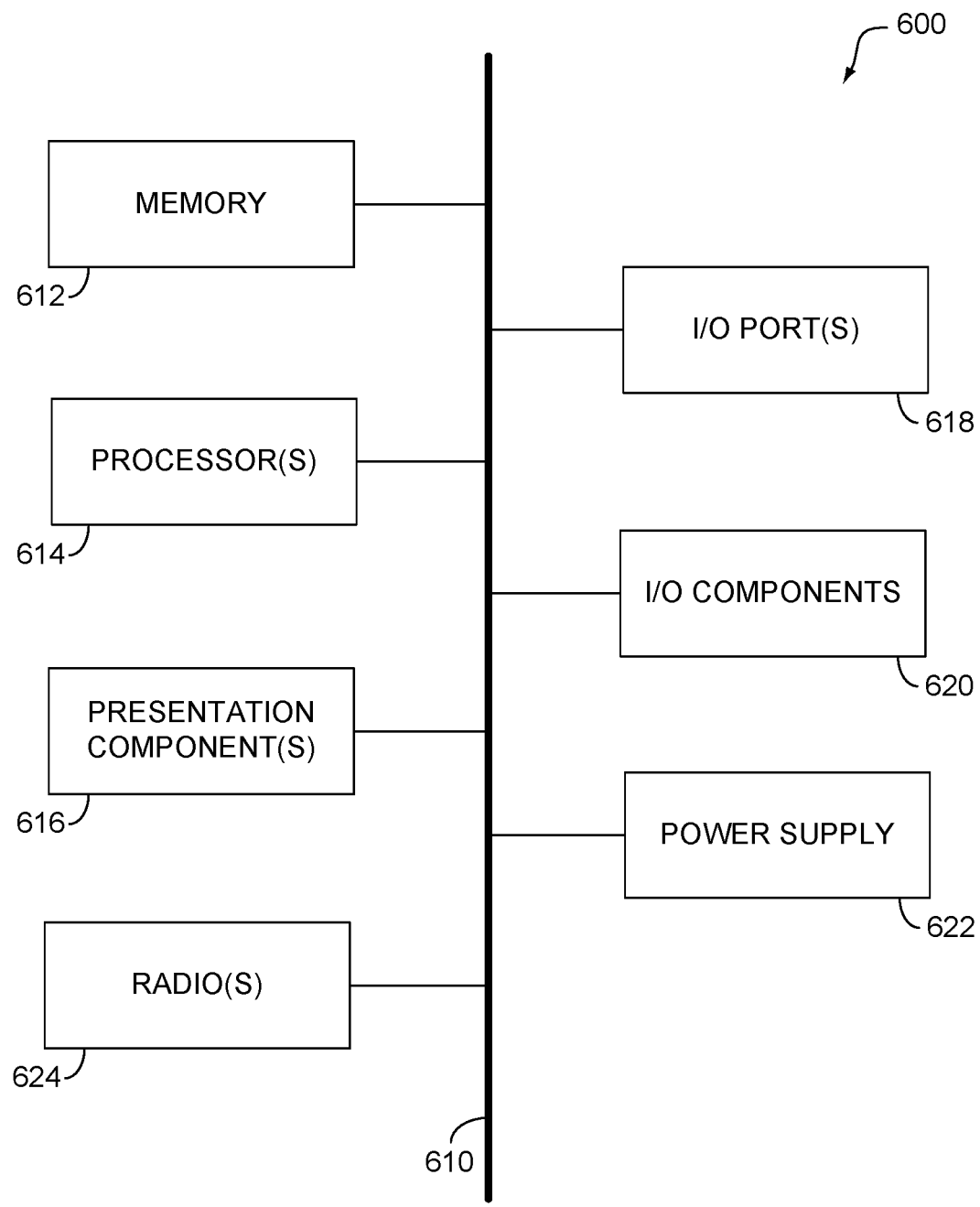
FIG. 6 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A computerized method for determining future semantic location information for a user, the method comprising: determining a current context associated with a current visit of the user to a current location; determining a set of historical user visits to the current location; based on the set of historical user visits and the current context, determining a history-based prediction for the next location of the user; determining a set of explicit signals associated with the user, the explicit signals comprising information about the user's future location; conflating information from the set of explicit signals and the history-based prediction to determine coherent prediction of a future location for the user; and providing the coherent prediction of the future location of the user.

The invention claimed is:

1. A computerized system comprising:
one or more sensors configured to provide sensor data comprising at least location information;
one or more processors; and
computer storage memory having computer-executable instructions stored thereon which, when executed by the one or more processors, implement a method of providing a personalized computing experience to a user based on a predicted future location of the user, the method comprising:
determining, using the one or more sensors, a current visit comprising a current context including at least a current location of the user;
determining a set of historic visits by the user to the current location;
determining, from the set of historic visits, a plurality of subsets of historic visits, wherein each subset of historic visits has a respective feature in common with the current visit;
based on the subsets of historic visits, determining a set of candidate predictions of a future location of the user, comprising a candidate prediction for each subset of historic visits;
determining a pattern-based prediction of the future location of the user from the set of candidate predictions;
determining an explicit signal for the user indicating information related to a location of the user at a future time corresponding to the pattern-based prediction;
performing conflation of the explicit signal and the pattern-based prediction to determine a coherent prediction of the user's future location, wherein the coherent prediction of the user's future location comprises a next semantic location for the user including at least a likely future departure time from the current location; and
initiating the personalized computing experience to the user based on the coherent prediction of the user's future location.

2. The computerized system of claim 1, wherein the personalized computing experience comprises a scheduling application, route-planning application, intelligent notification application, personalized content computing service, or automation application.

3. The computerized system of claim 1, wherein the next semantic location for the user further includes at least a likely arrival time, likely length of stay, user activity likely to be performed at the next semantic location, a venue of the next semantic location, or another person likely to be present at the next semantic location.

4. The computerized system of claim 1, wherein the pattern-based prediction is determined based on a next location visited after the current location having a highest observation count in a subset of the set of historic visits, the subset having at least location and another context in common with the current context.

5. The computerized system of claim 4, wherein each historic visit in the subset of historic visits includes at least a behavior feature pattern or a periodic feature pattern in common with the current visit.

6. The computerized system of claim 1, wherein determining the current context comprises determining one or more features of the current visit, and wherein determining the pattern-based prediction comprises:

determining a corresponding prediction confidence with each candidate prediction;
and selecting the candidate prediction having a highest prediction confidence as the determined pattern-based prediction.

7. The computerized system of claim 6, wherein the prediction confidence is determined as a product of a prediction probability, and a prediction significance determined based on a confidence interval, corresponding to the candidate prediction.

8. The computerized system of claim 6, wherein determining the set of candidate predictions comprises, for each candidate prediction:
performing visit filtering to determine the subset of historic visits for the candidate prediction;
determining a similarity score for each historic visit in the subset with respect to the current visit;
determining from the subset of historic visits, an example set of historic visits based on a comparison of the similarity score to a similarity threshold, the example set comprising those historic visits having a similarity score that satisfies the similarity threshold; and
determining the candidate prediction as a next location that occurs the most often, after the current location, in the example set.

9. The computerized system of claim 8, wherein the similarity score for each historic visit is based on a number of features in common with the current visit, and wherein the similarity threshold is predetermined or based on a number of historic visits in the subset.

10. The computerized system of claim 8, wherein determining the similarity score for each historic visit comprises determining a visitation sequence similarity between the historic visit and the current visit using a Levenschtein distance.

11. The computerized system of claim 1, wherein the explicit signal comprises information associated with the future location of the user, and wherein the explicit signal includes information indicating a flight, scheduled event, out-of-routine event, or ephemeral information.

12. The computerized system of claim 1, wherein performing conflation of the explicit signal and the pattern-based prediction comprises:
determining an explicit signal confidence associated with the explicit signal;
based at least on the explicit signal confidence, determining a level of conflict between the explicit signal and the pattern-based prediction; and
based on the level of conflict:
(1) overriding the pattern-based prediction with location information derived from the explicit signal to determine the coherent prediction;
(2) modifying the pattern-based prediction according to the explicit signal to determine the coherent prediction; or
(3) determining that the explicit signal will not impact the pattern-based prediction, and providing the pattern-based prediction as the coherent prediction.

13. A computing device comprising a computer memory and a computer processor that is configured to determine and utilize a prediction of a next location for a user to provide a personalized experience, the computing device comprising:
a computer program stored on the computer memory having computer instructions that when executed by the computer processor cause the computer processor to:
determine a current visit for the user to a current location;

determine a set of historic visits by the user to the current location, each historic visit including historic information about a subsequent location visited by the user after the current location;

determine, from the set of historic visits, a plurality of subsets of historic visits, wherein each subset of historic visits is determined based on a similarity between a feature of the subset of historic visits and a feature of the current visit;

based on the subsets of historic visits, determine a set of history-based candidate predictions of a future semantic location of the user, comprising a history-based candidate prediction for each subset of historic visits;

determine a history-based prediction of the future semantic location of the user from the set of history-based candidate predictions;

determine an explicit signal for the user indicating an alternative future location of the user at a time corresponding to the history-based prediction of the future semantic location;

conflate the explicit signal and the history-based prediction to determine the next location for the user, wherein conflate the explicit signal and the history-based prediction comprises:

determine a level of conflict between the explicit signal and the history-based prediction, and based on the level of conflict:

override the history-based prediction with location information derived from the explicit signal to determine the next location for the user, modify the history-based prediction according to the explicit signal to determine the next location for the user, or determine that the explicit signal will not impact the history-based prediction, and provide the history-based prediction as the next location for the user; and provide a personalized computing experience to the user based on the next location.

14. The computing device of claim 13, wherein the next location comprises a next semantic location for the user including at least an expected arrival time at the next location, an expected length of stay at the next location, an expected departure time from the current location, user activity likely to be performed at the next location, a venue of the next location, or another person likely to be present at the next location.

15. The computing device of claim 13, wherein the computer instructions, when executed by the computer processor, further cause the computer processor to:

determine a current context of the current visit, wherein determining the current context comprises determining a plurality of features of the current visit; and determine a first subset of historic visits having the plurality of features of the current visit, and wherein the history-based prediction is determined as the subsequent location visited having a highest observation count in the first subset.

16. The computing device of claim 15, wherein the plurality of features includes a behavior pattern feature or a periodic feature.

17. The computing device of claim 13, wherein the personalized computing experience comprises a scheduling service, route-planning to the next location, providing a notification associated with the next location, providing content based on the next location, or providing an automation service.

18. A computerized method for providing a personalized computing experience to a user based on a predicted next semantic location of the user, the method comprising:

determining a current visit comprising a current context for the user including a current location of the user, the current location determined using a location sensor;

determining a set of historic visits by the user to the current location, each historic visit including historic information about a subsequent location visited by the user after the current location;

determining, from the set of historic visits, a plurality of subsets of historic visits, wherein each subset of historic visits has a respective feature in common with the current visit;

based on the subsets of historic visits, determining a set of candidate predictions of a future location of the user, comprising a candidate prediction for each subset of historic visits;

determining a pattern-based prediction of the future location of the user from the set of candidate predictions, the pattern-based prediction including a future context related to the future location;

determining an explicit signal for the user indicating an alternative future location of the user at a time corresponding to the pattern-based prediction;

performing conflation of the explicit signal and the pattern-based prediction to determine the next semantic location for the user, wherein performing the conflation comprises:

determining a level of conflict between the explicit signal and the pattern-based prediction, and based on the level of conflict:

override the pattern-based prediction with location information derived from the explicit signal to determine the next semantic location for the user, modify the pattern-based prediction according to the explicit signal to determine the next semantic location for the user, or determine that the explicit signal will not impact the pattern-based prediction, and provide the pattern-based prediction as the next semantic location for the user; and initiating the personalized computing experience to the user based on the next semantic location, wherein the pattern-based prediction is determined based on a subset of the set of historic visits having at least location and a context feature in common with the current context, the pattern-based prediction determined as the subsequent location that occurs most often in the subset, and wherein the future context comprises an expected arrival time at the next semantic location, an expected length of stay at the next semantic location, an expected departure time from the current location, user activity likely to be performed at the next semantic location, a venue of the next semantic location, or another person likely to be present at the next semantic location.

19. The computerized method of claim 18, wherein determining the current context comprises determining one or more context features of the current visit, and wherein determining the pattern-based prediction comprises:

determining a corresponding prediction confidence with each candidate prediction;

and selecting the candidate prediction having a highest prediction confidence as the determined pattern-based prediction.

20. The computerized method of claim 19, wherein determining the set of candidate predictions comprises, for each candidate prediction:
- performing visit filtering to determine the subset of historic visits for the candidate prediction;
- determining a similarity score for each historic visit in the subset with respect to the current visit, based on a visitation sequence similarity between the historic visit and the current visit;
- determining from the subset of historic visits, an example set of historic visits based on a comparison of the similarity score to a similarity threshold, the example set comprising those historic visits having a similarity score that satisfies the similarity threshold; and
- determining the candidate prediction as the next semantic location that occurs the most often, after the current location, in the example set, wherein the similarity threshold is predetermined or based on a number of historic visits in the subset.

* * * * *